United States Patent
Li et al.

(10) Patent No.: US 11,044,567 B1
(45) Date of Patent: Jun. 22, 2021

(54) MICROPHONE DEGRADATION DETECTION AND COMPENSATION

(71) Applicant: Amazon Technologies, Inc., Seattle, WA (US)

(72) Inventors: Xiaoxue Li, Mountain View, CA (US); Trausti Thor Kristjansson, San Jose, CA (US); Philip R. Hilmes, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/800,577

(22) Filed: Feb. 25, 2020

Related U.S. Application Data

(60) Provisional application No. 62/913,828, filed on Oct. 11, 2019.

(51) Int. Cl.
  *H04R 29/00* (2006.01)
  *H04R 3/00* (2006.01)
  *H04R 1/40* (2006.01)
  *G10L 25/51* (2013.01)

(52) U.S. Cl.
  CPC ............ *H04R 29/005* (2013.01); *G10L 25/51* (2013.01); *H04R 1/406* (2013.01); *H04R 3/005* (2013.01)

(58) Field of Classification Search
  CPC .................................................... H04R 29/00
  See application file for complete search history.

(56) References Cited

U.S. PATENT DOCUMENTS

| | | | | |
|---|---|---|---|---|
| 10,455,341 | B2 * | 10/2019 | Barwicz | H04R 3/005 |
| 10,861,434 | B2 * | 12/2020 | Jain | G10K 11/17879 |
| 10,863,296 | B1 * | 12/2020 | Thoshkahna | H04R 5/04 |
| 2014/0369511 | A1 * | 12/2014 | Sheerin | H04R 29/004 381/58 |
| 2015/0304786 | A1 * | 10/2015 | Partio | H04R 29/004 381/58 |
| 2016/0037277 | A1 * | 2/2016 | Matsumoto | H04R 29/004 381/58 |

* cited by examiner

*Primary Examiner* — Olisa Anwah
(74) *Attorney, Agent, or Firm* — Lee & Hayes, P.C.

(57) ABSTRACT

Systems and methods for microphone degradation detection and compensation are disclosed. For example, microphones of an electronic device may capture audio and generate corresponding audio data, such as during a period of time where only ambient noise is present. Sound intensity level value differences between audio data from the various microphones may be determined and when one or more of the sound intensity level value differences satisfies a threshold amount, the microphone associated with the variant sound intensity level value may be determined to be degraded. The sound intensity level value difference may be compensated for, such as by utilizing sound boosting techniques and/or modifying parameters of a beamforming component.

17 Claims, 8 Drawing Sheets

US 11,044,567 B1

MICROPHONE DEGRADATION DETECTION AND COMPENSATION

RELATED APPLICATIONS

This application claims priority to and is a non-provisional application of U.S. Provisional Patent Application No. 62/913,828, filed on Oct. 11, 2019, the entire contents of which are incorporated herein by reference.

BACKGROUND

Electronic devices are now common in many environments such as homes and offices. Some electronic devices may include microphones for capturing audio from an environment. Such microphones may degrade. Described herein are improvements in technology and solutions to technical problems that can be used to, among other things, assist with issues associated with microphone degradation.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
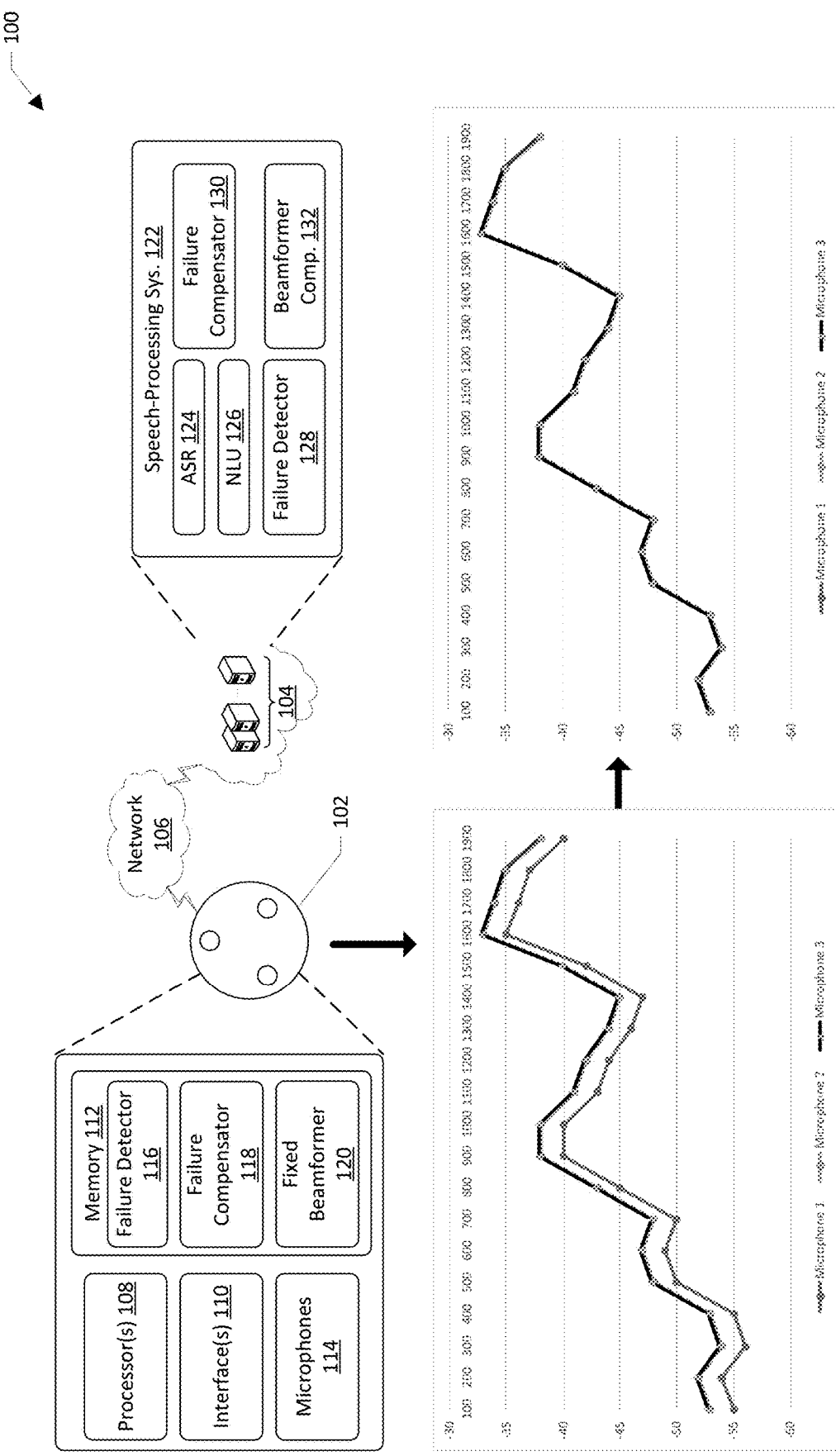
FIG. 1 illustrates a schematic diagram of an example environment for microphone degradation detection and compensation.

Systems and methods for microphone degradation detection and compensation are disclosed. Take, for example, an environment such as a room where an electronic device that includes multiple microphones is disposed. The electronic devices may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and/or accessory devices (e.g., lights, plugs, locks, thermostats, appliances, televisions, clocks, smoke detectors, doorbells, cameras, motion/magnetic/other security-system sensors, etc.). These electronic devices may be situated in a room of a home as described by way of example throughout this disclosure, in a place a business, healthcare facility (e.g., hospital, doctor's office, pharmacy, etc.), in vehicle (e.g., airplane, truck, car, bus, etc.) in a public forum (e.g., shopping center, store, etc.), etc.

The microphones may be configured to capture audio from the environment. The audio may include user speech input, audio from other devices such as televisions, speakers, phones, etc., and/or audio corresponding to ambient noises in the environment such as the humming of a motor associated with an appliance, outside ambient noise such as street noise, wind, rain, etc. In certain examples, the performance of one or more of the microphones may degrade over time, such as from ordinary wear and tear, from the accumulation of dust and/or other particles on a membrane of the microphone, component failure, etc. As performance of the microphone(s) degrade, the audio signal produced by such microphone(s) may decrease and/or may be altered. Such microphone degradation may hinder operations of the electronic device and/or other devices and/or systems that utilize the audio data. For example, electronic devices with multiple microphones may include a beamforming component, such as a fixed beamforming component, which may be utilized for directional signal transmission or reception. For example, elements in an antenna array may be combined in such a way that signals at particular angles experience constructive interference while others experience destructive interference. However, beamforming techniques generally rely on the signal strength of the audio data from each of the microphones to be the same or similar for the beamforming to work accurately. When a microphone degrades such that its signal strength differs from the audio data from the other microphones in the microphone array, beamforming accuracy may decrease, which may lead to a poor determination of the directionality of the audio source and a less accurate audio signal utilized for other processing, such as automatic speech recognition performed by the electronic device and/or a speech-processing system.

Described herein are systems and methods for microphone degradation detection and compensation. For example, the process of detecting microphone degradation may begin with microphones of the microphone array capturing audio and generating audio data. In examples, the microphones may be continuously capturing audio and the generated audio data may be stored, such as temporarily in a buffer. In other examples, the electronic device and/or a remote system associated with the electronic device may determine when to command the microphones to generate audio data and/or when to utilize audio data generated by the microphones. For example, detection of signal strength differences between microphones may be performed with accuracy when the environment is relatively quiet, such as when only ambient noise and not speech input or other audio input is being received. In these examples, the electronic device and/or the remote system may monitor the sound intensity level value of audio data received from the microphones and may determine a time, a period of time, and/or a time of day when audio data from the microphones is to be utilized for microphone degradation detection. It should be understood that the determination of when an environment is quiet enough to perform microphone degradation detection may be a dynamic determination that may be based at least in part on the environment. For example, a first environment may have generally less ambient noise than a second environment. In these and other examples, the electronic device and/or the remote system may utilize audio data with frequencies between about 100 Hz and 1,000 Hz to determine microphone degradation.

Additionally, or alternatively, determining when to utilize audio data for microphone degradation detection may be based at least in part on performance of speech processing techniques utilizing audio data. For example, when a confidence value associated with automatic speech recognition and/or natural language understanding techniques falls below a threshold confidence value and/or when the audio data from the electronic device is determined to be of less than sufficient quality for performing operations based on that audio data, the electronic device and/or the remote system may generate a command to activate the microphones and/or to utilize audio data generated by the microphones for degradation detection.

Once microphone degradation detection is initiated, audio data from some or all of the microphones in the microphone array may be generated by the microphones. The audio data may indicate a frequency of the corresponding audio and a sound intensity level value associated with the audio data. For examples where degradation detection is performed when only ambient noise is present in the environment, the sound intensity level value may be between, for example, −65 decibels to −30 decibels. The sound intensity level values associated with each audio data sample may be compared to the other audio data samples to determine whether one or more of the audio data samples indicates a lower sound intensity level value than the other microphones. For example, when the microphones are working properly and no degradation has occurred, the sound intensity level value associated with each audio data sample may be the same or very similar, such as within 1 decibel of the other audio data samples. However, when degradation of a microphone occurs, the sound intensity level value of the degraded microphone may be a threshold amount lower than the sound intensity level value of the other microphones. In examples, the threshold amount may be, for example, 1.5 decibels lower than the audio data samples from non-degraded microphones. It should be understood that the threshold amount may be static and/or may be dynamic and be based at least in part on historical data indicating sound intensity level values of audio data generated by the microphones in question and/or may be based at least in part on a degree of speech-processing performance degradation associated with the degraded microphone. For example, for a given microphone array, speech-processing performance may not be hindered until one of the microphones has a 2, 3, 5, or 10 decibel difference from the other microphones, while for another microphone array, a sound intensity level value difference of 1.5 may be sufficient to cause speech-processing performance issues.

A failure detector component, which may be a component of the electronic device and/or the remote system, may accept the audio data samples from the microphones and may determine whether one or more of the audio data samples has a sound intensity level value that differs from the other audio data samples by at least the threshold amount. The failure detector may determine which microphone is associated with the audio data sample having the sound intensity level value difference and the failure detector may determine the degree of the sound intensity level value difference. In some examples, multiple microphones may be determined to have been degraded by the failure detector. In these examples, each of the degraded microphones may be identified and the sound intensity level value difference for each of these microphones may be determined. The failure detector component may generate data indicating the microphone(s) that are degraded and the sound intensity level value difference(s). This data may be sent to a failure compensator for further processing.

The failure compensator may utilize the data generated by the failure detector to determine how to correct for the microphone degradation. For example, the failure compensator may increase the sound intensity level value of the audio data from the degraded microphone by the sound intensity level value difference determined by the failure detector. This "boosting" of the signal from the degraded microphone may bring the sound intensity level value of the audio data from the degraded microphone into the same or a similar range as the sound intensity level values of audio data from the other microphones. In other examples, the failure compensator may determine how to adjust parameters, such as mathematical coefficients, utilized by a fixed beamformer of the electronic device to compensate for the sound intensity level value difference. For example, beamformers may be configured to determine a directionality of a sound source, but in doing so may depend at least in part on the audio signal received from the microphones in a microphone array having the same or similar sound intensity level values. Having a microphone with a sound intensity level value difference may indicate to the beamformer that the sound source is less likely to be in a direction of that microphone, even if that is not in fact the case. To compensate for this, the coefficients associated with each audio data signal may be altered such that the beamformer accounts for the lower sound intensity level value from the degraded microphone. In examples, the failure detector and/or the failure compensator may determine whether to utilize the boosting technique and/or the beamformer coefficient technique described herein. For example, when the sound intensity level value difference satisfies a given threshold, such the sound intensity level value difference being greater than 5 decibels, 7 decibels, 8 decibels, 9 decibels, or 10 decibels, the beamformer coefficient technique may be utilized. When the sound intensity level value difference does not satisfy the threshold, the boosting technique may be utilized. It should be understood that the failure compensator may be configured to modify the parameters of the fixed beamformer and/or a beamforming component of the remote system may be configured to modify the parameters of the fixed beamformer. The beamformer may then accept audio data from the microphones and perform beamforming techniques utilizing the audio data from the non-degraded microphones and the audio data from the degraded microphone with the degradation level being compensated for. In examples, an audio signal may be output by the fixed beamformer and may be sent to a remote system for speech processing, such as to be utilized in automatic speech recognition and/or natural language understanding processing.

Additionally, or alternatively, the processes described herein may be utilized to determine when a microphone has failed, as compared to just being degraded. For example, one or more components of the microphone, such as a membrane of the microphone, may crack or otherwise stop working properly such that the audio data from the microphone is of significantly less quality than audio data from the other microphones. In these examples, the failure detector may determine that the sound intensity level value difference satisfies a threshold indicating microphone failure, such as a sound intensity level value difference of greater than 10 decibels. In these examples, the failure compensator may determine that the microphone is not be utilized for speech processing and parameters of the beamformer may be altered to not consider the microphone in the microphone array.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for microphone degradation detection and compensation. The system 100 may include, for example, an electronic device 102, which may include communal devices, personal devices, and/or other devices. In certain examples, at least some of the devices 102 may be voice-enabled devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more other devices, such as personal devices, which may be electronic devices, such as a mobile phone, tablet, laptop, wearable device, and/or other computing device that is specifically associated with a given user profile. The electronic devices 102 may be configured to send data to and/or receive data from a remote system 104, such as via a network 106. Additionally, it should be understood that a given space and/or environment may include numerous electronic devices 102 and/or personal devices. It should also be understood that when a "space" or "environment" is used herein, those terms mean an area and not necessarily a given room, building, or other structure, unless otherwise specifically described as such.

The electronic devices 102 may include one or more components, such as, for example, one or more processors 108, one or more network interfaces 110, memory 112, and/or one or more microphones 114. The microphones 114 may be configured to capture audio, such as user utterances, and generate corresponding audio data. The electronic device 102 may also include one or more speakers that may be configured to output audio, such as audio corresponding to audio data received from another device and/or the system 104. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. The memory 112 may include one or more components such as, for example, a failure detector 116, a failure compensator 118, and/or a fixed beamformer 120, which will be described in more detail below. It should be understood that when voice-enabled devices are described herein, those voice-enabled devices may include phones, computers, and/or other computing devices.

The remote system 104 may include components such as, for example, a speech-processing system 122, which may include one or more components such as an automatic speech recognition (ASR) component 124, a natural language understanding (NLU) component 126, a failure detector 128, a failure compensator 130, and/o a beamformer component 132. It should be understood that while the speech-processing system 122 and/or the other components are depicted as separate from each other in FIG. 1, some or all of the components may be a part of the same system. Each of the components described herein with respect to the remote system 104 may be associated with their own systems, which collectively may be referred to herein as the remote system 104, and/or some or all of the components may be associated with a single system. Additionally, the remote system 104 may include one or more applications, which may be described as skills. "Skills," as described herein may be applications and/or may be a subset of an application. For example, a skill may receive data representing an intent. For example, an intent may be determined by the NLU component 126 and/or as determined from user input via a computing device. Skills may be configured to utilize the intent to output data for input to a text-to-speech component, a link or other resource locator for audio data, and/or a command to a device, such as the device 102.

In instances where a voice-enabled device is utilized, skills may extend the functionality of devices 102 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device, and send data and/or instructions associated with the input to one or more other devices.

The components of the remote system 104 are described in detail below. In examples, some or each of the components of the remote system 104 may include their own processor(s), network interface(s), and/or memory. As such, by way of example, the speech-processing system 122 may include and/or be associated with processor(s), network interface(s), and/or memory. The other components of the remote system 104, such as the beamformer component 132, may include and/or be associated with different processor(s), network interface(s), and/or memory, or one or more of these components may utilize some or all of the same processor(s), network interface(s), and/or memory utilized by the speech-processing system 122. These components are described in detail below. Additionally, the operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The components of the electronic device 102 and/or the remote system 104 will now be described by way of example.

A user registry component may be configured to determine and/or generate associations between users, user accounts, and/or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between devices, such as the devices 102. The user registry may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 122 may be configured to receive audio data from the devices 102 and/or other devices and perform speech-processing operations. For example, the ASR component 124 may be configured to generate text data corresponding to the audio data, and the NLU component 126 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Song A," the NLU component 126 may identify a "help" intent and the payload may be "present user." In this example where the intent data indicates an intent to receive aid, the speech-processing system 122 may call one or more speechlets to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component 126, such as by an orchestrator of the remote system 104, and may perform operations to instruct the device 102 to perform an operation. The remote system 104 may generate audio data confirming that a communication channel has been established, in examples, such as by the text-to-speech component. The audio data may be sent from the remote system 104 to the device 102 for output of corresponding audio by the speakers of the device 102.

The microphones 114 may be configured to capture audio from the environment. The audio may include user speech input, audio from other devices such as televisions, speakers, phones, etc., and/or audio corresponding to ambient noises in the environment such as the humming of a motor associated with an appliance, outside ambient noise such as street noise, wind, rain, etc. In certain examples, the performance of one or more of the microphones 114 may degrade over time, such as from ordinary wear and tear, from the accumulation of dust and/or other particles on a membrane of the microphone, component failure, etc. As performance of the microphone(s) 114 degrade, the audio signal produced by such microphone(s) 114 may decrease and/or may be altered. Such microphone degradation may hinder operations of the electronic device 102 and/or other devices and/or systems that utilize the audio data. For example, electronic devices 102 with multiple microphones 104 may include the fixed beamformer 120, which may be utilized for directional signal transmission or reception. For example, elements in an antenna array may be combined in such a way that signals at particular angles experience constructive interference while others experience destructive interference. However, beamforming techniques generally rely on the signal strength of the audio data from each of the microphones 114 to be the same or similar for the beamforming to work accurately. When a microphone 114 degrades such that its signal strength differs from the audio data from the other microphones 114 in the microphone array, beamforming accuracy may decrease, which may lead to a poor determination of the directionality of the audio source and a less accurate audio signal utilized for other processing, such as processing by the ASR component 124 and/or the NLU component 126.

In examples, the microphones 114 may be continuously capturing audio and the generated audio data may be stored, such as temporarily in a buffer. In other examples, the electronic device 102 and/or the remote system 104 associated with the electronic device 102 may determine when to command the microphones 114 to generate audio data and/or when to utilize audio data generated by the microphones 114. For example, detection of signal strength differences between microphones 114 may be performed with accuracy when the environment is relatively quiet, such as when only ambient noise and not speech input or other audio input is being received. In these examples, the electronic device 102 and/or the remote system 104 may monitor the sound intensity level value of audio data received from the microphones 114 and may determine a time, a period of time, and/or a time of day when audio data from the microphones 114 is to be utilized for microphone degradation detection. It should be understood that the determination of when an environment is quiet enough to perform microphone degradation detection may be a dynamic determination that may be based at least in part on the environment. For example, a first environment may have generally less ambient noise than a second environment. In these and other examples, the electronic device 102 and/or the remote system 104 may utilize audio data with frequencies between about 100 Hz and 1,000 Hz to determine microphone degradation.

Additionally, or alternatively, determining when to utilize audio data for microphone degradation detection may be based at least in part on performance of speech processing techniques utilizing audio data. For example, when a confidence value associated with automatic speech recognition and/or natural language understanding techniques falls below a threshold confidence value and/or when the audio data from the electronic device 102 is determined to be of less than sufficient quality for performing operations based on that audio data, the electronic device 102 and/or the remote system 104 may generate a command to activate the microphones 114 and/or to utilize audio data generated by the microphones 114 for degradation detection.

Once microphone degradation detection is initiated, audio data from some or all of the microphones 114 in the microphone array may be generated by the microphones 114. The audio data may indicate a frequency of the corresponding audio and a sound intensity level value associated with the audio data. For examples where degradation detection is performed when only ambient noise is present in the environment, the sound intensity level value may be between, for example, −65 decibels to −30 decibels. The sound intensity level values associated with each audio data sample may be compared to the other audio data samples to determine whether one or more of the audio data samples indicates a lower sound intensity level value than the other microphones 114. For example, when the microphones 114 are working properly and no degradation has occurred, the sound intensity level value associated with each audio data sample may be the same or very similar, such as within 1 decibel of the other audio data samples. However, when degradation of a microphone 114 occurs, the sound intensity level value of the degraded microphone 114 may be a threshold amount lower than the sound intensity level value of the other microphones 114. In examples, the threshold amount may be, for example, 1.5 decibels lower than the audio data samples from non-degraded microphones 114. It should be understood that the threshold amount may be static and/or may be dynamic and be based at least in part on historical data indicating sound intensity level values of audio data generated by the microphones 114 in question and/or may be based at least in part on a degree of speech-processing performance degradation associated with the degraded microphone 114. For example, for a given microphone array, speech-processing performance may not be hindered until one of the microphones 114 has a 2, 3, 5, or 10 decibel difference from the other microphones 114, while for another microphone array, a sound intensity level value difference of 1.5 may be sufficient to cause speech-processing performance issues.

The failure detector component 116, 128, which may be a component of the electronic device 102 and/or the remote system 104, may accept the audio data samples from the microphones 114 and may determine whether one or more of the audio data samples has a sound intensity level value that differs from the other audio data samples by at least the threshold amount. The failure detector 116, 128 may determine which microphone 114 is associated with the audio data sample having the sound intensity level value difference and the failure detector 116, 128 may determine the degree of the sound intensity level value difference. In some examples, multiple microphones 114 may be determined to have been degraded by the failure detector 116, 128. In these examples, each of the degraded microphones 114 may be identified and the sound intensity level value difference for each of these microphones 114 may be determined. The failure detector component 116, 128 may generate data indicating the microphone(s) 114 that are degraded and the sound intensity level value difference(s). This data may be sent to the failure compensator 118, 130 for further processing.

The failure compensator 118, 130 may utilize the data generated by the failure detector 116, 128 to determine how to correct for the microphone degradation. For example, the failure compensator 118, 130 may increase the sound intensity level value of the audio data from the degraded microphone 114 by the sound intensity level value difference determined by the failure detector 116, 128. This "boosting" of the signal from the degraded microphone 114 may bring the sound intensity level value of the audio data from the degraded microphone 114 into the same or a similar range as the sound intensity level values of audio data from the other microphones 114. In other examples, the failure compensator 118, 130 may determine how to adjust parameters, such as mathematical coefficients, utilized by the fixed beamformer 120, to compensate for the sound intensity level value difference. For example, beamformers may be configured to determine a directionality of a sound source, but in doing so may depend at least in part on the audio signal received from the microphones 114 in a microphone array having the same or similar sound intensity level values. Having a microphone 114 with a sound intensity level value difference being a threshold amount may indicate to the beamformer that the sound source is less likely to be in a direction of that microphone 114, even if that is not in fact the case. To compensate for this, the coefficients associated with each audio data signal may be altered such that the beamformer accounts for the lower sound intensity level value from the degraded microphone 114. In examples, the failure detector 116, 128 and/or the failure compensator 118, 130 may determine whether to utilize the boosting technique and/or the beamformer coefficient technique described herein. For example, when the sound intensity level value difference satisfies a given threshold, such the sound intensity level value difference being greater than 5 decibels, 7 decibels, 8 decibels, 9 decibels, or 10 decibels, the beamformer coefficient technique may be utilized. When the sound intensity level value difference does not satisfy the threshold, the boosting technique may be utilized. It should be understood that the failure compensator 118, 130 may be configured to modify the parameters of the fixed beamformer 120 and/or a beamforming component 132 of the remote system 104 may be configured to modify the parameters of the fixed beamformer 120. The beamformer 120 may then accept audio data from the microphones 114 and perform beamforming techniques utilizing the audio data from the non-degraded microphones 114 and the audio data from the degraded microphone 114 with the degradation level being compensated for. In examples, an audio signal may be output by the fixed beamformer 120 and may be sent to the remote system 104 for speech processing, such as to be utilized in automatic speech recognition and/or natural language understanding processing.

Additionally, or alternatively, the processes described herein may be utilized to determine when a microphone 114 has failed, as compared to just being degraded. For example, one or more components of the microphone 114, such as a membrane of the microphone 114, may crack or otherwise stop working properly such that the audio data from the microphone 114 is of significantly less quality than audio data from the other microphones 114. In these examples, the failure detector 116, 128 may determine that the sound intensity level value difference satisfies a threshold indicating microphone failure, such as a sound intensity level value difference of greater than 10 decibels. In these examples, the failure compensator 118, 130 may determine that the microphone 114 is not be utilized for speech processing and parameters of the beamformer may be altered to not consider the microphone 114 in the microphone array.

It should be noted that while text data is described as a type of data utilized to communicate between various components of the remote system 104 and/or other systems and/or devices, the components of the remote system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 104 and the associated functionality of those components as described herein may be performed by one or more of the electronic devices 102 and/or personal devices. Additionally, or alternatively, some or all of the components and/or functionalities associated with the electronic devices 102 and/or personal devices may be performed by the remote system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the remote system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the remote system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the remote system 104 may possess its own local memory, which also may store program components, program data, and/or one or more operating systems.

The memory 112 and/or the memory described with respect to the components of the remote system 104 may include volatile and nonvolatile memory, removable and non-removable media implemented in any method or technology for storage of information, such as computer-readable instructions, data structures, program component, or other data. Such memory 112 and/or the memory described with respect to the components of the remote system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the remote system 104 may be implemented as computer-readable storage media ("CRSM"), which may be any available physical media accessible by the processor(s) 108 and/or the processor(s) described with respect to the remote system 104 to execute instructions stored on the memory 112 and/or the memory described with respect to the components of the remote system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the remote system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110 and/or the network interface(s) described with respect to the components of the remote system 104 may enable messages between the components and/or devices shown in system 100 and/or with one or more other polling systems, as well as other networked devices. Such network interface(s) 110 and/or the network interface(s) described with respect to the components of the remote system 104 may include one or more network interface controllers (NICs) or other types of transceiver devices to send and receive messages over the network 106.

For instance, each of the network interface(s) 110 and/or the network interface(s) described with respect to the components of the remote system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the remote system 104 may include a wide area network (WAN) component to enable message over a wide area network.

In some instances, the remote system 104 may be local to an environment associated the electronic devices 102 and/or personal devices. For instance, the remote system 104 may be located within one or more of the electronic devices 102 and/or personal devices. In some instances, some or all of the functionality of the remote system 104 may be performed by one or more of the electronic devices 102 and/or personal devices. Also, while various components of the remote system 104 have been labeled and named in this disclosure and each component has been described as being configured to cause the processor(s) to perform certain operations, it should be understood that the described operations may be performed by some or all of the components and/or other components not specifically illustrated.

Figure 2:
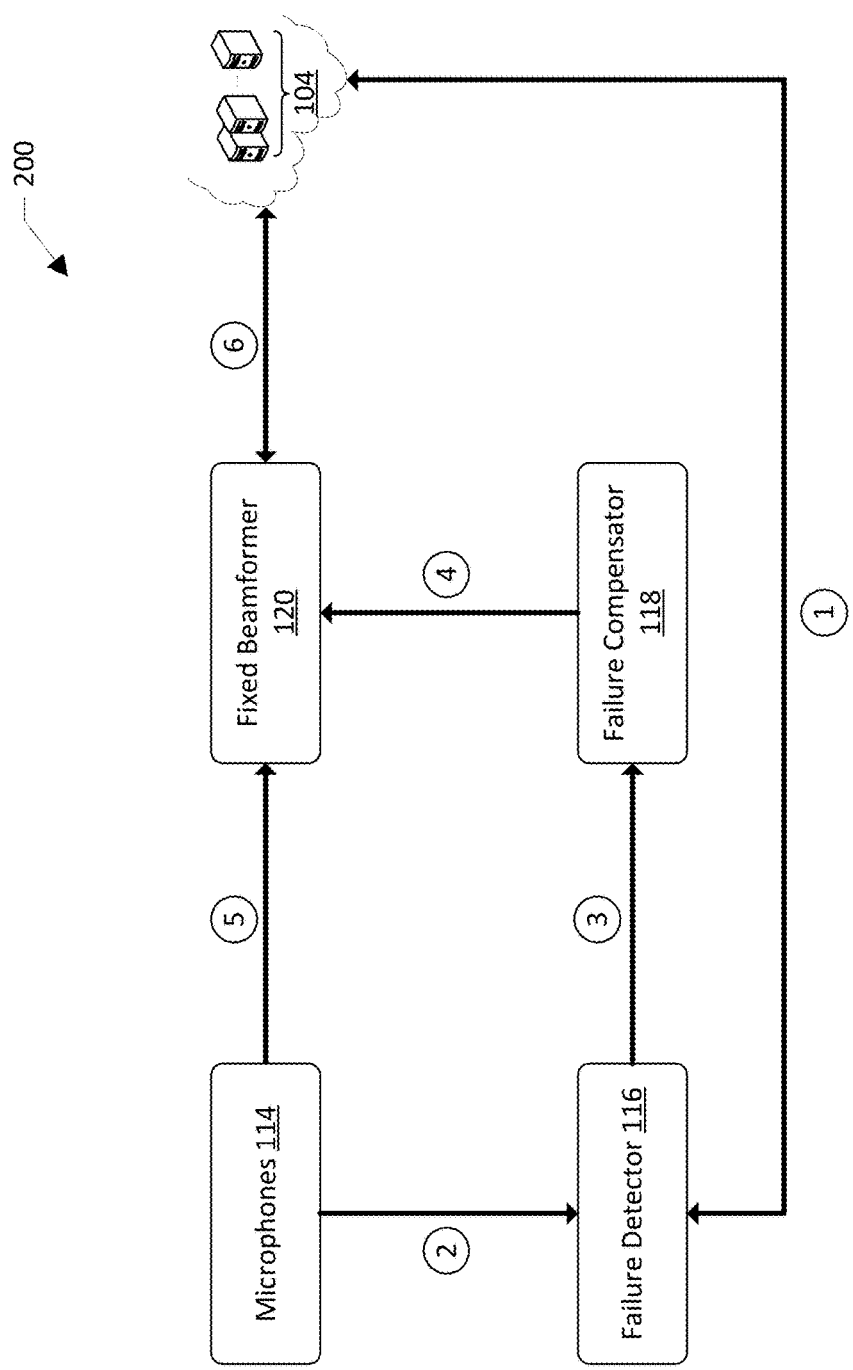
FIG. 2 illustrates a conceptual diagram of components of a system utilized for microphone degradation detection and compensation.

FIG. 2 illustrates a conceptual diagram of components of a system 200 utilized for microphone degradation detection and compensation. The system 200 may include the same or similar components as those illustrated in FIG. 1, such as one or more microphones 114, a failure detector 116, a failure compensator 118, a fixed beamformer 120, and/or a remote system 104, which may include a speech-processing system. The system 200 is depicted with reference to steps 1-6. It should be understood that the process described with respect to FIG. 2 may include more or fewer steps, and/or the steps may be performed in an order that differs from 1 through 6.

At step 1, an electronic device having the microphones 114 and/or the remote system 104 associated with the electronic device may determine when to command the microphones 114 to generate audio data and/or when to utilize audio data generated by the microphones 114. For example, detection of signal strength differences between microphones 114 may be performed with accuracy when the environment is relatively quiet, such as when only ambient noise and not speech input or other audio input is being received. In these examples, the electronic device and/or the remote system 104 may monitor the sound intensity level value of audio data received from the microphones 114 and may determine a time, a period of time, and/or a time of day when audio data from the microphones 114 is to be utilized for microphone degradation detection. It should be understood that the determination of when an environment is quiet enough to perform microphone degradation detection may be a dynamic determination that may be based at least in part on the environment. For example, a first environment may have generally less ambient noise than a second environment. In these and other examples, the electronic device and/or the remote system 104 may utilize audio data with frequencies between about 100 Hz and 1,000 Hz to determine microphone degradation.

Additionally, or alternatively, determining when to utilize audio data for microphone degradation detection may be based at least in part on performance of speech processing techniques utilizing audio data. For example, when a confidence value associated with automatic speech recognition and/or natural language understanding techniques falls below a threshold confidence value and/or when the audio data from the electronic device is determined to be of less than sufficient quality for performing operations based on that audio data, the electronic device and/or the remote system 104 may generate a command to activate the microphones 114 and/or to utilize audio data generated by the microphones 114 for degradation detection.

At step 2, audio data from some or all of the microphones 114 in the microphone array may be generated by the microphones 114. The audio data may indicate a frequency of the corresponding audio and a sound intensity level value associated with the audio data. For examples where degradation detection is performed when only ambient noise is present in the environment, the sound intensity level value may be between, for example, −65 decibels to −30 decibels. The sound intensity level values associated with each audio data sample may be compared to the other audio data samples to determine whether one or more of the audio data samples indicates a lower sound intensity level value than the other microphones 114. For example, when the microphones 114 are working properly and no degradation has occurred, the sound intensity level value associated with each audio data sample may be the same or very similar, such as within 1 decibel of the other audio data samples. However, when degradation of a microphone 114 occurs, the sound intensity level value of the degraded microphone 114 may be a threshold amount lower than the sound intensity level value of the other microphones 114. In examples, the threshold amount may be, for example, 1.5 decibels lower than the audio data samples from non-degraded microphones 114. It should be understood that the threshold amount may be static and/or may be dynamic and be based at least in part on historical data indicating sound intensity level values of audio data generated by the microphones 114 in question and/or may be based at least in part on a degree of speech-processing performance degradation associated with the degraded microphone 114. For example, for a given microphone array, speech-processing performance may not be hindered until one of the microphones 114 has a 2, 3, 5, or 10 decibel difference from the other microphones 114, while for another microphone array, a sound intensity level value difference of 1.5 may be sufficient to cause speech-processing performance issues.

At step 3, the failure detector component 116, which may be a component of the electronic device and/or the remote system 104, may accept the audio data samples from the microphones 114 and may determine whether one or more of the audio data samples has a sound intensity level value that differs from the other audio data samples by at least the threshold amount. The failure detector 116 may determine which microphone 114 is associated with the audio data sample having the sound intensity level value difference and the failure detector 116 may determine the degree of the sound intensity level value difference. In some examples, multiple microphones 114 may be determined to have been degraded by the failure detector 116. In these examples, each of the degraded microphones 114 may be identified and the sound intensity level value difference for each of these microphones 114 may be determined. The failure detector component 116 may generate data indicating the microphone(s) 114 that are degraded and the sound intensity level value difference(s). This data may be sent to the failure compensator 118 for further processing. In examples, the failure detector 116 may send data indicating the sound intensity level value difference to the remote system 104 for further processing, such as for generating beamforming coefficients and/or for determining a decibel value to increase sample audio data to when a boosting technique is utilized, as described more fully herein.

At step 4, the failure compensator 118 may utilize the data generated by the failure detector 116 to determine how to correct for the microphone degradation. For example, the failure compensator 118 may increase the sound intensity level value of the audio data from the degraded microphone 114 by the sound intensity level value difference determined by the failure detector 116. This "boosting" of the signal from the degraded microphone 114 may bring the sound intensity level value of the audio data from the degraded microphone 114 into the same or a similar range as the sound intensity level values of audio data from the other microphones 114. In other examples, the failure compensator 118 may determine how to adjust parameters, such as mathematical coefficients, utilized by the fixed beamformer 120, to compensate for the sound intensity level value difference. For example, beamformers may be configured to determine a directionality of a sound source, but in doing so may depend at least in part on the audio signal received from the microphones 114 in a microphone array to having same or similar sound intensity level values. Having a microphone 114 with a sound intensity level value difference being a threshold amount may indicate to the beamformer that the sound source is less likely to be in a direction of that microphone 114, even if that is not in fact the case. To compensate for this, the coefficients associated with each audio data signal may be altered such that the beamformer accounts for the lower sound intensity level value from the degraded microphone 114. In examples, the failure detector 116 and/or the failure compensator 118 may determine whether to utilize the boosting technique and/or the beamformer coefficient technique described herein. For example, when the sound intensity level value difference satisfies a given threshold, such the sound intensity level value difference being greater than 5 decibels, 7 decibels, 8 decibels, 9 decibels, or 10 decibels, the beamformer coefficient technique may be utilized. When the sound intensity level value difference does not satisfy the threshold, the boosting technique may be utilized. It should be understood that the failure compensator 118 may be configured to modify the parameters of the fixed beamformer 120 and/or a beamforming component of the remote system 104 may be configured to modify the parameters of the fixed beamformer 120. The beamformer 120 may then accept audio data from the microphones 114 and perform beamforming techniques utilizing the audio data from the non-degraded microphones 114 and the audio data from the degraded microphone 114 with the degradation level being compensated for.

At step 5, the microphones 114 may capture subsequent audio and generate audio data. The sound intensity level value of the audio data from the degraded microphone may be boosted as described herein and/or the parameters of the beamformer 120 may be changed to account for the sound intensity level value difference between the audio data from the degraded microphone and the audio data from the other microphones.

At step 6, an audio signal may be output by the fixed beamformer 120 and may be sent to the remote system 104 for speech processing, such as to be utilized in automatic speech recognition and/or natural language understanding processing.

Figure 3:
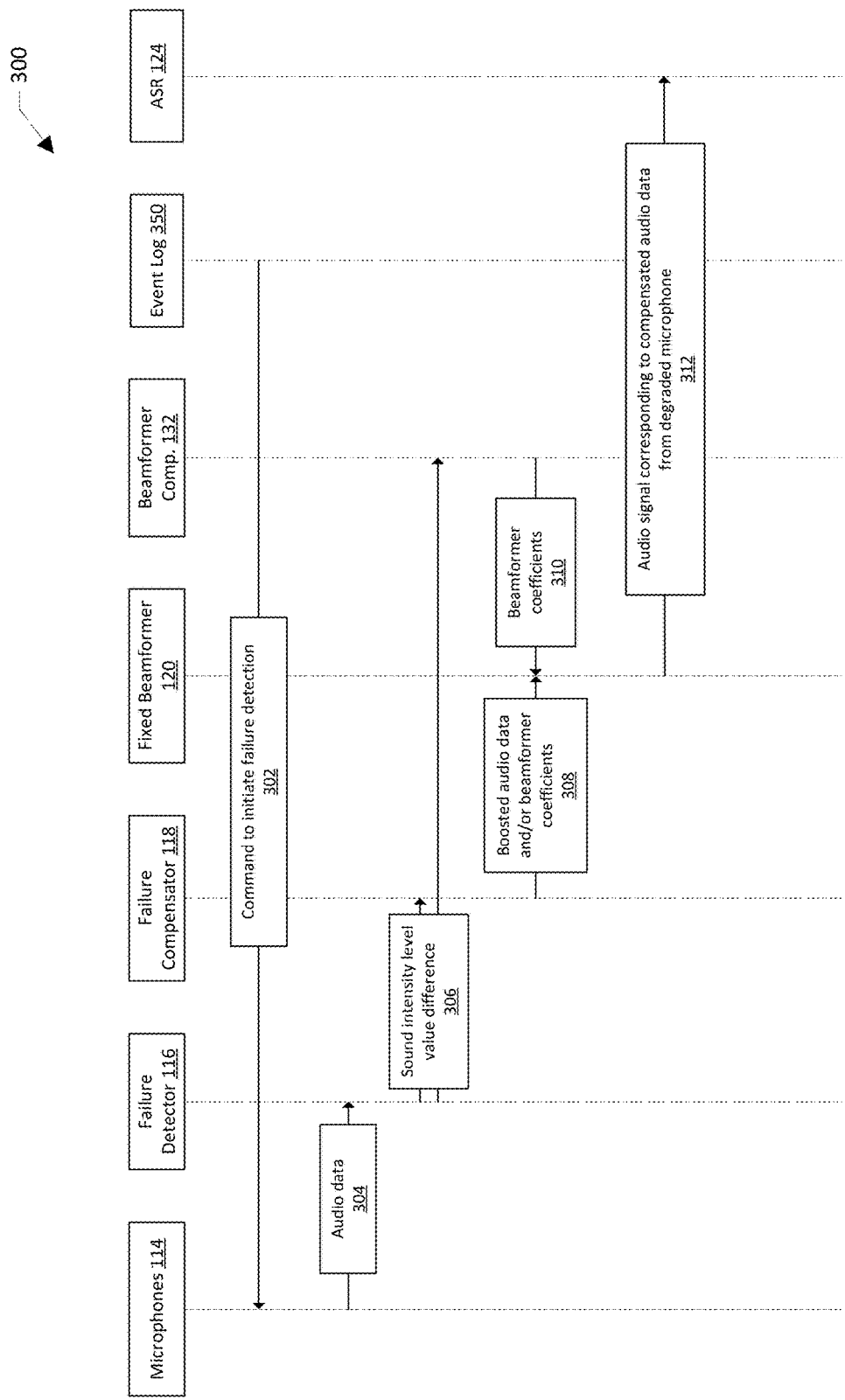
FIG. 3 illustrates a sequence diagram of example processes for microphone degradation detection and compensation.

FIG. 3 illustrates a sequence diagram of example processes for microphone degradation detection and compensation. It should be understood that while the sequence diagram 300 is described in a stepwise manner, some or all of the operations described with respect to FIG. 3 may be performed in a different order and/or in parallel.

At block 302, an event log 350 of a remote system may determine that speech-processing performance has decreased for a given electronic device having microphones in a microphone array. The remote system may generate and send a command to initiate failure detection at the electronic device. For example, an electronic device having the microphones 114 and/or a remote system associated with the electronic device may determine when to command the microphones 114 to generate audio data and/or when to utilize audio data generated by the microphones 114. For example, detection of signal strength differences between microphones 114 may be performed with accuracy when the environment is relatively quiet, such as when only ambient noise and not speech input or other audio input is being received. In these examples, the electronic device and/or the remote system may monitor the sound intensity level value of audio data received from the microphones 114 and may determine a time, a period of time, and/or a time of day when audio data from the microphones 114 is to be utilized for microphone degradation detection. It should be understood that the determination of when an environment is quiet enough to perform microphone degradation detection may be a dynamic determination that may be based at least in part on the environment. For example, a first environment may have generally less ambient noise than a second environment. In these and other examples, the electronic device and/or the remote system may utilize audio data with frequencies between about 100 Hz and 1,000 Hz to determine microphone degradation.

Additionally, or alternatively, determining when to utilize audio data for microphone degradation detection may be based at least in part on performance of speech processing techniques utilizing audio data. For example, when a confidence value associated with automatic speech recognition and/or natural language understanding techniques falls below a threshold confidence value and/or when the audio data from the electronic device is determined to be of less than sufficient quality for performing operations based on that audio data, the electronic device and/or the remote system may generate a command to activate the microphones 114 and/or to utilize audio data generated by the microphones 114 for degradation detection.

At block 304, the microphones 114 may capture audio from the environment and generate corresponding audio data. The audio data may be sent to a failure detector 116 to determine if one or more of the microphones has degraded. For example, audio data from some or all of the microphones 114 in the microphone array may be generated by the microphones 114. The audio data may indicate a frequency of the corresponding audio and a sound intensity level value associated with the audio data. For examples where degradation detection is performed when only ambient noise is present in the environment, the sound intensity level value may be between, for example, −65 decibels to −30 decibels. The sound intensity level values associated with each audio data sample may be compared to the other audio data samples to determine whether one or more of the audio data samples indicates a lower sound intensity level value than the other microphones 114. For example, when the microphones 114 are working properly and no degradation has occurred, the sound intensity level value associated with each audio data sample may be the same or very similar, such as within 1 decibel of the other audio data samples. However, when degradation of a microphone 114 occurs, the sound intensity level value of the degraded microphone 114 may be a threshold amount lower than the sound intensity level value of the other microphones 114. In examples, the threshold amount may be, for example, 1.5 decibels lower than the audio data samples from non-degraded microphones 114. It should be understood that the threshold amount may be static and/or may be dynamic and be based at least in part on historical data indicating sound intensity level values of audio data generated by the microphones 114 in question and/or may be based at least in part on a degree of speech-processing performance degradation associated with the degraded microphone 114. For example, for a given microphone array, speech-processing performance may not be hindered until one of the microphones 114 has a 2, 3, 5, or 10 decibel difference from the other microphones 114, while for another microphone array, a sound intensity level value difference of 1.5 may be sufficient to cause speech-processing performance issues.

At block 306, the failure detector may determine a sound intensity level value difference between a first microphone of the microphones and the other microphones. For example, the failure detector component 116, which may be a component of the electronic device and/or the remote system, may accept the audio data samples from the microphones 114 and may determine whether one or more of the audio data samples has a sound intensity level value that differs from the other audio data samples by at least the threshold amount. The failure detector 116 may determine which microphone 114 is associated with the audio data sample having the sound intensity level value difference and the failure detector 116 may determine the degree of the sound intensity level value difference. In some examples, multiple microphones 114 may be determined to have been degraded by the failure detector 116. In these examples, each of the degraded microphones 114 may be identified and the sound intensity level value difference for each of these microphones 114 may be determined. The failure detector component 116 may generate data indicating the microphone(s) 114 that are degraded and the sound intensity level value difference(s). This data may be sent to the failure compensator 118 for further processing. Data representing the sound intensity level value difference may be sent from the failure detector 116 to the failure compensator 118 and/or the beamformer component 132.

At block 308, the failure compensator 118 may perform processes to account for the sound intensity level value difference. Those processes may include increasing the sound intensity level value of audio data from the degraded microphone to the same or a similar sound intensity level value as the audio data from the other microphones. Additionally, or alternatively, the failure compensator 118 may determine how to adjust parameters of the fixed beamformer 120, such as coefficients associated with the microphones, to account for the sound intensity level value difference. For example, the failure compensator 118 may utilize the data generated by the failure detector 116 to determine how to correct for the microphone degradation. The failure compensator 118 may increase the sound intensity level value of the audio data from the degraded microphone 114 by the sound intensity level value difference determined by the failure detector 116. This "boosting" of the signal from the degraded microphone 114 may bring the sound intensity level value of the audio data from the degraded microphone 114 into the same or a similar range as the sound intensity level values of audio data from the other microphones 114. In other examples, the failure compensator 118 may determine how to adjust parameters, such as mathematical coefficients, utilized by the fixed beamformer 120, to compensate for the sound intensity level value difference. For example, beamformers may be configured to determine a directionality of a sound source, but in doing so may depend at least in part on the audio signal received from the microphones 114 in a microphone array to having same or similar sound intensity level values. Having a microphone 114 with a sound intensity level value difference being a threshold amount may indicate to the beamformer that the sound source is less likely to be in a direction of that microphone 114, even if that is not in fact the case. To compensate for this, the coefficients associated with each audio data signal may be altered such that the beamformer accounts for the lower sound intensity level value from the degraded microphone 114. In examples, the failure detector 116 and/or the failure compensator 118 may determine whether to utilize the boosting technique and/or the beamformer coefficient technique described herein. For example, when the sound intensity level value difference satisfies a given threshold, such the sound intensity level value difference being greater than 5 decibels, 7 decibels, 8 decibels, 9 decibels, or 10 decibels, the beamformer coefficient technique may be utilized. When the sound intensity level value difference does not satisfy the threshold, the boosting technique may be utilized. It should be understood that the failure compensator 118 may be configured to modify the parameters of the fixed beamformer 120 and/or a beamforming component of the remote system 104 may be configured to modify the parameters of the fixed beamformer 120. The beamformer 120 may then accept audio data from the microphones 114 and perform beamforming techniques utilizing the audio data from the non-degraded microphones 114 and the audio data from the degraded microphone 114 with the degradation level being compensated for.

Additionally, or alternatively from the processes in block 308, at block 310, the beamformer component 132 may determine the beamformer parameters, such as the beamformer coefficients, and send data representing those parameters to the fixed beamformer 120. The beamformer component 132 may determine the parameters for the fixed beamformer 120 to utilize to account for the microphone degradation in the same or a similar manner to how the failure compensator 118 may determine the parameters as described herein.

At block 312, the fixed beamformer may generate an audio signal corresponding to audio data from the degraded microphone with the sound intensity level value difference accounted for and the audio data from the other microphones. This audio signal may be sent to a speech-processing system, and in examples to an ASR component 124. For example, the microphones 114 may capture subsequent audio and generate audio data. The sound intensity level value of the audio data from the degraded microphone may be boosted as described herein and/or the parameters of the beamformer 120 may be changed to account for the sound intensity level value difference between the audio data from the degraded microphone and the audio data from the other microphones. An audio signal may be output by the fixed beamformer 120 and may be sent to the remote system, including for example the ASR component 124, for speech processing.

Figure 4:
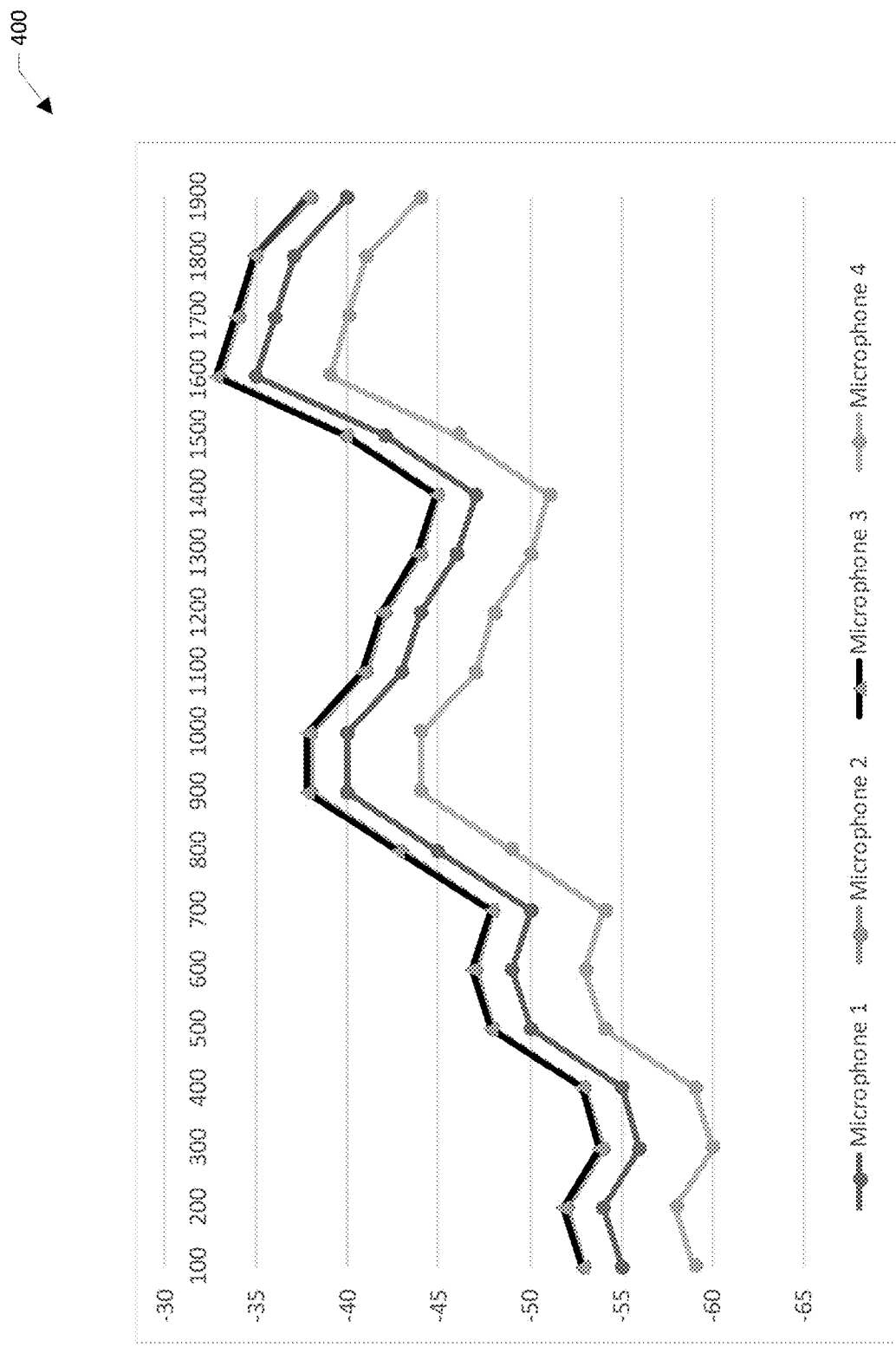
FIG. 4 illustrates a graph showing microphone signal strength over multiple frequencies.

FIG. 4 illustrates a graph 400 showing microphone signal strength over multiple frequencies. The Y-axis of the graph 400 shows sound intensity level values of audio data received from Microphones 1-4 in decibels. The X-axis of the graph 400 shows frequency of the audio data in Hz. To determine the sound intensity level value associated with a microphone across frequencies as shown in FIG. 4, variations in the signal, including unpredictable perturbations in the acoustic environment may be considered and dealt with. For example, to determine the sound intensity level value difference, also described herein as the inter-channel difference, background noise levels are utilized. The determination of the sound intensity level value of the background noise may utilize one or more equations to determine a recursively-averaged version of the instant channel energy of a microphone. For example, Equation 1 below may be utilized:

$$y(n)=(1-\alpha)\Sigma_{t=0}^{n}\alpha^{n-t}*x(t) \quad \text{(Equation 1)}$$

Here, x(n) represents the instance channel energy associated with a given microphone and y(n) represents the recursively-averaged version of x(n). $\alpha$ $(0<\alpha<1)$ is the forgetting factor that gives exponentially less weight to old samples. For simplicity, Equation 1 may be rewritten as Equation 2, which may be utilized for determining the recursively-averaged version o the instant channel energy.

$$y(n)=\alpha*y(n-1)+(1-\alpha)*x(n) \quad \text{(Equation 2)}$$

In these examples, with a large forgetting factor value, such as >0.99, y(n) is capable of capturing the long-term consistency of x(n) and filtering out outliers, such as short sound activity and/or acoustic perturbations. This process may be repeated for each of the microphones being analyzed, and the estimated background noise level for each signal may be compared to each other to determine if one or more of the signals is associated with a sound intensity level value that satisfies a threshold amount indicating microphone degradation. These processes may, in examples, be performed by a failure detector component of the electronic device.

In some examples, multiple microphones may be determined to have been degraded by the failure detector. In these examples, each of the degraded microphones 114 may be identified and the sound intensity level value difference for each of these microphones 114 may be determined. This can be seen for example in FIG. 4, where Microphone 1 produces audio data with a sound intensity level value that is approximately 1.5 decibels lower than Microphones 2 and 3. Also, Microphone 4 produces audio data with a sound intensity level value that is approximately 6 decibels lower than Microphones 2 and 3. The failure detector component may generate data indicating the microphone(s) 114 that are degraded and the sound intensity level value difference(s). This data may be sent to the failure compensator for further processing.

Figure 5:
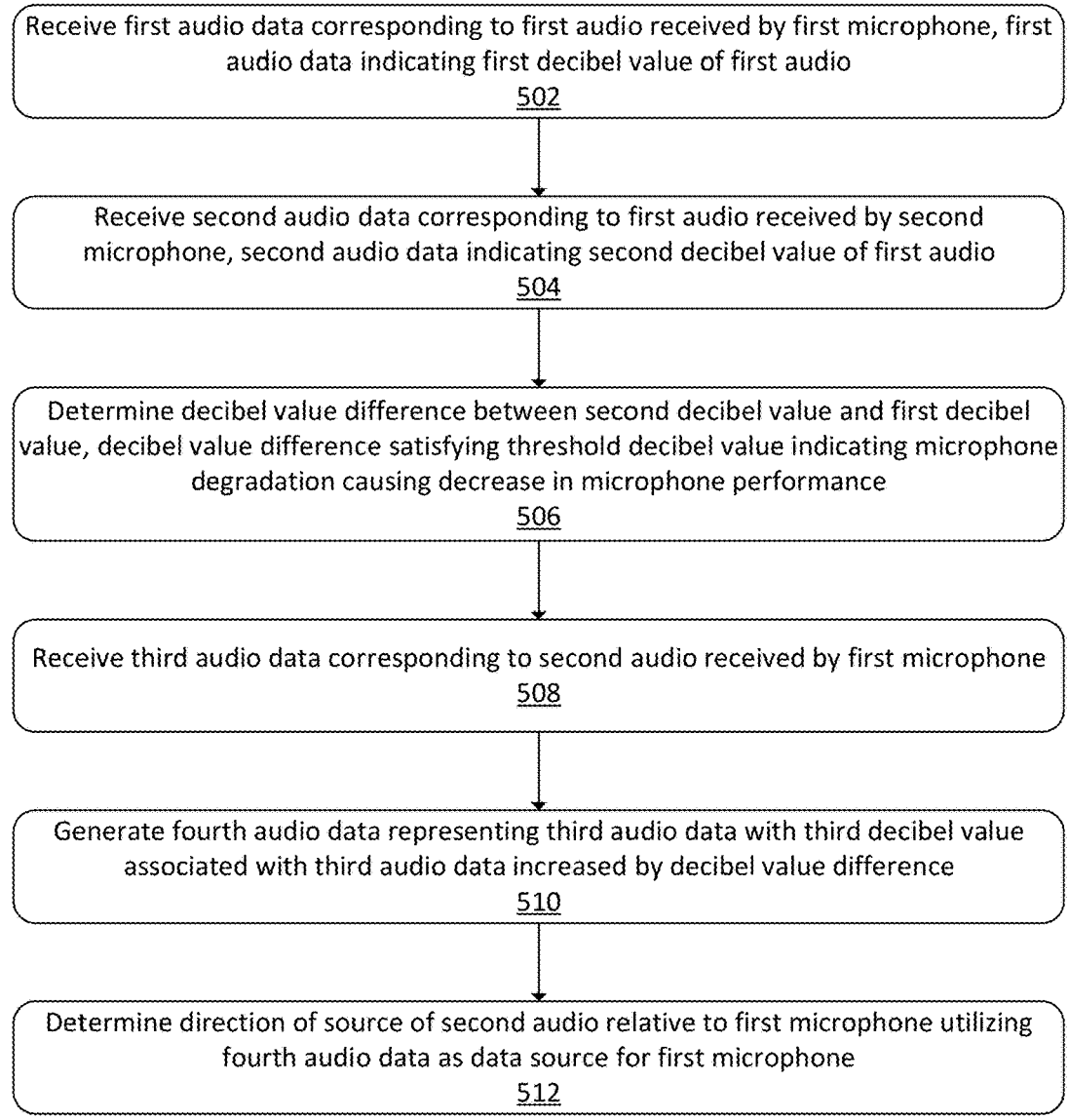
FIG. 5 illustrates a flow diagram of an example process for microphone degradation detection and compensation.
Figure 6:
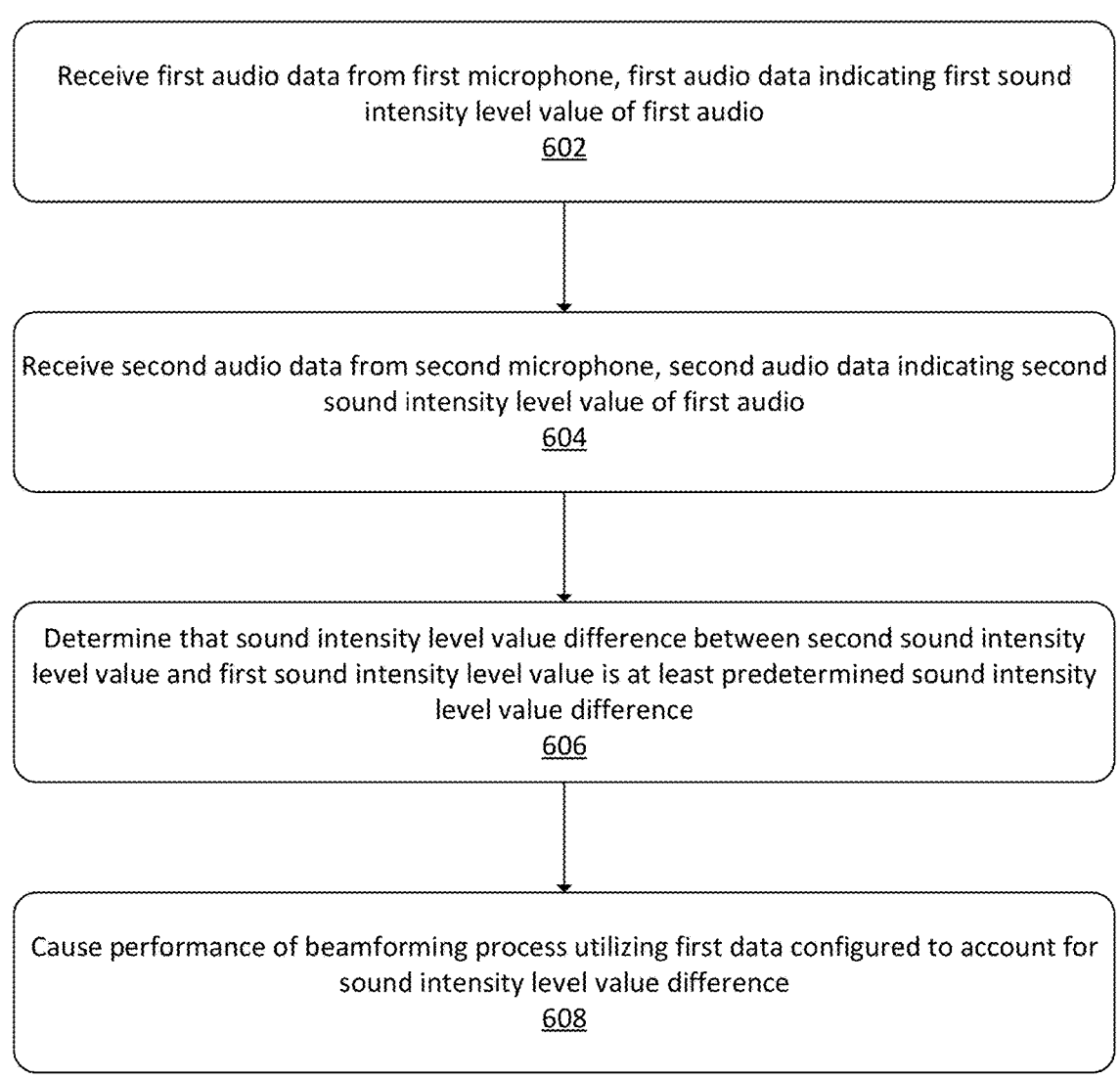
FIG. 6 illustrates a flow diagram of another example process for microphone degradation detection and compensation.

FIGS. 5 and 6 illustrate processes for microphone degradation determination and compensation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 7, and 8, although the processes may be implemented in a wide variety of other environments, architectures and systems.

FIG. 5 illustrates a flow diagram of an example process 500 for microphone degradation detection and compensation. The order in which the operations or steps are described is not intended to be construed as a limitation, and any number of the described operations may be combined in any order and/or in parallel to implement process 500.

At block 502, the process 500 may include receiving first audio data corresponding to first audio received by a first microphone, the first audio data indicating a first decibel value of the first audio. For example, the microphones of a device may be configured to capture audio from the environment. The audio may include user speech input, audio from other devices such as televisions, speakers, phones, etc., and/or audio corresponding to ambient noises in the environment such as the humming of a motor associated with an appliance, outside ambient noise such as street noise, wind, rain, etc. In certain examples, the performance of one or more of the microphones may degrade over time, such as from ordinary wear and tear, from the accumulation of dust and/or other particles on a membrane of the microphone, component failure, etc. As performance of the microphone(s) degrade, the audio signal produced by such microphone(s) may decrease and/or may be altered. Such microphone degradation may hinder operations of the electronic device and/or other devices and/or systems that utilize the audio data. For example, electronic devices with multiple microphones may include a beamforming component, such as a fixed beamforming component, which may be utilized for directional signal transmission or reception. For example, elements in an antenna array may be combined in such a way that signals at particular angles experience constructive interference while others experience destructive interference. However, beamforming techniques generally rely on the signal strength of the audio data from each of the microphones to be the same or similar for the beamforming to work accurately. When a microphone degrades such that its signal strength differs from the audio data from the other microphones in the microphone array, beamforming accuracy may decrease, which may lead to a poor determination of the directionality of the audio source and a less accurate audio signal utilized for other processing, such as automatic speech recognition performed by the electronic device and/or a speech-processing system.

In examples, the microphones may be continuously capturing audio and the generated audio data may be stored, such as temporarily in a buffer. In other examples, the electronic device and/or a remote system associated with the electronic device may determine when to command the microphones to generate audio data and/or when to utilize audio data generated by the microphones. For example, detection of signal strength differences between microphones may be performed with accuracy when the environment is relatively quiet, such as when only ambient noise and not speech input or other audio input is being received. In these examples, the electronic device and/or the remote system may monitor the sound intensity level value of audio data received from the microphones and may determine a time, a period of time, and/or a time of day when audio data from the microphones is to be utilized for microphone degradation detection. It should be understood that the determination of when an environment is quiet enough to perform microphone degradation detection may be a dynamic determination that may be based at least in part on the environment. For example, a first environment may have generally less ambient noise than a second environment. In these and other examples, the electronic device and/or the remote system may utilize audio data with frequencies between about 100 Hz and 1,000 Hz to determine microphone degradation.

Additionally, or alternatively, determining when to utilize audio data for microphone degradation detection may be based at least in part on performance of speech processing techniques utilizing audio data. For example, when a confidence value associated with automatic speech recognition and/or natural language understanding techniques falls below a threshold confidence value and/or when the audio data from the electronic device is determined to be of less than sufficient quality for performing operations based on that audio data, the electronic device and/or the remote system may generate a command to activate the microphones and/or to utilize audio data generated by the microphones for degradation detection.

At block 504, the process 500 may include receiving second audio data corresponding to the first audio received by a second microphone, the second audio data indicating a second decibel value of the first audio. The second audio data may be received in the same or a similar manner as receiving the first audio data.

At block 506, the process 500 may include determining a decibel value difference between the second decibel value and the first decibel value, the decibel value difference satisfying a threshold decibel value indicating microphone degradation causing a decrease in microphone performance. For example, the audio data may indicate a frequency of the corresponding audio and a sound intensity level value associated with the audio data. For examples where degradation detection is performed when only ambient noise is present in the environment, the sound intensity level value may be between, for example, −65 decibels to −30 decibels. The sound intensity level values associated with each audio data sample may be compared to the other audio data samples to determine whether one or more of the audio data samples indicates a lower sound intensity level value than the other microphones. For example, when the microphones are working properly and no degradation has occurred, the sound intensity level value associated with each audio data sample may be the same or very similar, such as within 1 decibel of the other audio data samples. However, when degradation of a microphone occurs, the sound intensity level value of the degraded microphone may be a threshold amount lower than the sound intensity level value of the other microphones. In examples, the threshold amount may be, for example, 1.5 decibels lower than the audio data samples from non-degraded microphones. It should be understood that the threshold amount may be static and/or may be dynamic and be based at least in part on historical data indicating sound intensity level values of audio data generated by the microphones in question and/or may be based at least in part on a degree of speech-processing performance degradation associated with the degraded microphone. For example, for a given microphone array, speech-processing performance may not be hindered until one of the microphones has a 2, 3, 5, or 10 decibel difference from the other microphones, while for another microphone array, a sound intensity level value difference of 1.5 may be sufficient to cause speech-processing performance issues.

A failure detector component, which may be a component of the electronic device and/or the remote system, may accept the audio data samples from the microphones and may determine whether one or more of the audio data samples has a sound intensity level value that differs from the other audio data samples by at least the threshold amount. The failure detector may determine which microphone is associated with the audio data sample having the sound intensity level value difference and the failure detector may determine the degree of the sound intensity level value difference. In some examples, multiple microphones may be determined to have been degraded by the failure detector. In these examples, each of the degraded microphones may be identified and the sound intensity level value difference for each of these microphones may be determined. The failure detector component may generate data indicating the microphone(s) that are degraded and the sound intensity level value difference(s). This data may be sent to a failure compensator for further processing.

At block 510, the process 500 may include receiving third audio data corresponding to second audio received by the first microphone. The third audio data may be received in the same or a similar manner as receiving the first audio data and/or the second audio data.

At block 512, the process 500 may include generating fourth audio data representing the third audio data with a third decibel value associated with the third audio data increased by the decibel value difference. For example, a failure compensator may utilize the data generated by the failure detector to determine how to correct for the microphone degradation. For example, the failure compensator may increase the sound intensity level value of the audio data from the degraded microphone by the sound intensity level value difference determined by the failure detector. This "boosting" of the signal from the degraded microphone may bring the sound intensity level value of the audio data from the degraded microphone into the same or a similar range as the sound intensity level values of audio data from the other microphones. In other examples, the failure compensator may determine how to adjust parameters, such as mathematical coefficients, utilized by a fixed beamformer of the electronic device to compensate for the sound intensity level value difference. For example, beamformers may be configured to determine a directionality of a sound source, but in doing so may depend at least in part on the audio signal received from the microphones in a microphone array to having same or similar sound intensity level values. Having a microphone with a sound intensity level value difference may indicate to the beamformer that the sound source is less likely to be in a direction of that microphone, even if that is not in fact the case. To compensate for this, the coefficients associated with each audio data signal may be altered such that the beamformer accounts for the lower sound intensity level value from the degraded microphone. In examples, the failure detector and/or the failure compensator may determine whether to utilize the boosting technique and/or the beamformer coefficient technique described herein. For example, when the sound intensity level value difference satisfies a given threshold, such the sound intensity level value difference being greater than 5 decibels, 7 decibels, 8 decibels, 9 decibels, or 10 decibels, the beamformer coefficient technique may be utilized. When the sound intensity level value difference does not satisfy the threshold, the boosting technique may be utilized. It should be understood that the failure compensator may be configured to modify the parameters of the fixed beamformer and/or a beamforming component of the remote system may be configured to modify the parameters of the fixed beamformer.

At block 514, the process 500 may include determining a direction of a source of the second audio relative to the first microphone utilizing the fourth audio data as a data source for the first microphone. For example, the beamformer may accept audio data from the microphones and perform beamforming techniques utilizing the audio data from the non-degraded microphones and the audio data from the degraded microphone with the degradation level being compensated for. In examples, an audio signal may be output by the fixed beamformer and may be sent to a remote system for speech processing, such as to be utilized in automatic speech recognition and/or natural language understanding processing.

Additionally, or alternatively, the process 500 may include determining an ambient noise decibel value associated with the environment in which the first microphone and the second microphone are disposed. The process 500 may also include determining, using one of the first microphone or the second microphone, a first period of time during which a sound intensity level value associated with the environment is substantially the same as the ambient noise decibel value. In these examples, the first audio data and the second audio data are received during the first period of time.

Additionally, or alternatively, the process 500 may include receiving fifth audio data from a third microphone, the fifth audio data indicating a third decibel value of the fifth audio data. The process 500 may also include receiving sixth audio data from the second microphone, the sixth audio data indicating a fourth decibel value of the sixth audio data. The process 500 may also include determining that a second decibel value difference between the fourth decibel value and the third decibel value is equal to or greater than a second threshold decibel value, wherein the second threshold decibel value indicates microphone failure. The process 500 may also include refraining from utilizing audio data samples from the third microphone in response to determining that the second decibel value difference is equal to or greater than the second threshold decibel value.

Additionally, or alternatively, the process 500 may include receiving, at a second time occurring after the first time, fifth audio data from the first microphone, the fifth audio data indicating a third decibel value of the fifth audio data. The process 500 may also include receiving, at the second time, sixth audio data from the second microphone, the sixth audio data indicating a fourth decibel value of the sixth audio data. The process 500 may also include determining that a second decibel value difference between the fourth decibel value and the third decibel value is equal to or greater than a second threshold decibel value, wherein the second threshold decibel value indicates more microphone degradation than the first threshold decibel value. The process 500 may also include, in response to determining that the second decibel value difference is equal to or greater than the second threshold decibel value, increasing a beamforming coefficient associated with the first microphone to compensate for the second decibel value difference.

FIG. 6 illustrates a flow diagram of another example process 600 for microphone degradation detection and compensation. The order in which the operations or steps are described is not intended to be construed as a limitation, and any number of the described operations may be combined in any order and/or in parallel to implement process 600.

At block 602, the process 600 may include receiving first audio data from a first microphone, the first audio data indicating a first sound intensity level value of the first audio. For example, the microphones of a device may be configured to capture audio from the environment. The audio may include user speech input, audio from other devices such as televisions, speakers, phones, etc., and/or audio corresponding to ambient noises in the environment such as the humming of a motor associated with an appliance, outside ambient noise such as street noise, wind, rain, etc. In certain examples, the performance of one or more of the microphones may degrade over time, such as from ordinary wear and tear, from the accumulation of dust and/or other particles on a membrane of the microphone, component failure, etc. As performance of the microphone(s) degrade, the audio signal produced by such microphone(s) may decrease and/or may be altered. Such microphone degradation may hinder operations of the electronic device and/or other devices and/or systems that utilize the audio data. For example, electronic devices with multiple microphones may include a beamforming component, such as a fixed beamforming component, which may be utilized for directional signal transmission or reception. For example, elements in an antenna array may be combined in such a way that signals at particular angles experience constructive interference while others experience destructive interference. However, beamforming techniques generally rely on the signal strength of the audio data from each of the microphones to be the same or similar for the beamforming to work accurately. When a microphone degrades such that its signal strength differs from the audio data from the other microphones in the microphone array, beamforming accuracy may decrease, which may lead to a poor determination of the directionality of the audio source and a less accurate audio signal utilized for other processing, such as automatic speech recognition performed by the electronic device and/or a speech-processing system.

In examples, the microphones may be continuously capturing audio and the generated audio data may be stored, such as temporarily in a buffer. In other examples, the electronic device and/or a remote system associated with the electronic device may determine when to command the microphones to generate audio data and/or when to utilize audio data generated by the microphones. For example, detection of signal strength differences between microphones may be performed with accuracy when the environment is relatively quiet, such as when only ambient noise and not speech input or other audio input is being received. In these examples, the electronic device and/or the remote system may monitor the sound intensity level value of audio data received from the microphones and may determine a time, a period of time, and/or a time of day when audio data from the microphones is to be utilized for microphone degradation detection. It should be understood that the determination of when an environment is quiet enough to perform microphone degradation detection may be a dynamic determination that may be based at least in part on the environment. For example, a first environment may have generally less ambient noise than a second environment. In these and other examples, the electronic device and/or the remote system may utilize audio data with frequencies between about 100 Hz and 1,000 Hz to determine microphone degradation.

Additionally, or alternatively, determining when to utilize audio data for microphone degradation detection may be based at least in part on performance of speech processing techniques utilizing audio data. For example, when a confidence value associated with automatic speech recognition and/or natural language understanding techniques falls below a threshold confidence value and/or when the audio data from the electronic device is determined to be of less than sufficient quality for performing operations based on that audio data, the electronic device and/or the remote system may generate a command to activate the microphones and/or to utilize audio data generated by the microphones for degradation detection.

At block 604, the process 600 may include receiving second audio data from a second microphone, the second audio data indicating a second sound intensity level value of the first audio. The second audio data may be received in the same or a similar manner as receiving the first audio data.

At block 606, the process 600 may include determining that a sound intensity level value difference between the second sound intensity level value and the first sound intensity level value is at least a predetermined sound intensity level value difference. For example, the audio data may indicate a frequency of the corresponding audio and a sound intensity level value associated with the audio data. For examples where degradation detection is performed when only ambient noise is present in the environment, the sound intensity level value may be between, for example, −65 decibels to −30 decibels. The sound intensity level values associated with each audio data sample may be compared to the other audio data samples to determine whether one or more of the audio data samples indicates a lower sound intensity level value than the other microphones. For example, when the microphones are working properly and no degradation has occurred, the sound intensity level value associated with each audio data sample may be the same or very similar, such as within 1 decibel of the other audio data samples. However, when degradation of a microphone occurs, the sound intensity level value of the degraded microphone may be a threshold amount lower than the sound intensity level value of the other microphones. In examples, the threshold amount may be, for example, 1.5 decibels lower than the audio data samples from non-degraded microphones. It should be understood that the threshold amount may be static and/or may be dynamic and be based at least in part on historical data indicating sound intensity level values of audio data generated by the microphones in question and/or may be based at least in part on a degree of speech-processing performance degradation associated with the degraded microphone. For example, for a given microphone array, speech-processing performance may not be hindered until one of the microphones has a 2, 3, 5, or 10 decibel difference from the other microphones, while for another microphone array, a sound intensity level value difference of 1.5 may be sufficient to cause speech-processing performance issues.

A failure detector component, which may be a component of the electronic device and/or the remote system, may accept the audio data samples from the microphones and may determine whether one or more of the audio data samples has a sound intensity level value that differs from the other audio data samples by at least the threshold amount. The failure detector may determine which microphone is associated with the audio data sample having the sound intensity level value difference and the failure detector may determine the degree of the sound intensity level value difference. In some examples, multiple microphones may be determined to have been degraded by the failure detector. In these examples, each of the degraded microphones may be identified and the sound intensity level value difference for each of these microphones may be determined. The failure detector component may generate data indicating the microphone(s) that are degraded and the sound intensity level value difference(s). This data may be sent to a failure compensator for further processing.

At block 610, the process 600 may include causing performance of a beamforming process utilizing first data configured to account for the sound intensity level value difference. For example, a failure compensator may utilize the data generated by the failure detector to determine how to correct for the microphone degradation. For example, the failure compensator may increase the sound intensity level value of the audio data from the degraded microphone by the sound intensity level value difference determined by the failure detector. This "boosting" of the signal from the degraded microphone may bring the sound intensity level value of the audio data from the degraded microphone into the same or a similar range as the sound intensity level values of audio data from the other microphones. In other examples, the failure compensator may determine how to adjust parameters, such as mathematical coefficients, utilized by a fixed beamformer of the electronic device to compensate for the sound intensity level value difference. For example, beamformers may be configured to determine a directionality of a sound source, but in doing so may depend at least in part on the audio signal received from the microphones in a microphone array having the same or similar sound intensity level values. Having a microphone with a sound intensity level value difference may indicate to the beamformer that the sound source is less likely to be in a direction of that microphone, even if that is not in fact the case. To compensate for this, the coefficients associated with each audio data signal may be altered such that the beamformer accounts for the lower sound intensity level value from the degraded microphone. In examples, the failure detector and/or the failure compensator may determine whether to utilize the boosting technique and/or the beamformer coefficient technique described herein. For example, when the sound intensity level value difference satisfies a given threshold, such the sound intensity level value difference being greater than 5 decibels, 7 decibels, 8 decibels, 9 decibels, or 10 decibels, the beamformer coefficient technique may be utilized. When the sound intensity level value difference does not satisfy the threshold, the boosting technique may be utilized. It should be understood that the failure compensator may be configured to modify the parameters of the fixed beamformer and/or a beamforming component of the remote system may be configured to modify the parameters of the fixed beamformer.

The beamformer may accept audio data from the microphones and perform beamforming techniques utilizing the audio data from the non-degraded microphones and the audio data from the degraded microphone with the degradation level being compensated for. In examples, an audio signal may be output by the fixed beamformer and may be sent to a remote system for speech processing, such as to be utilized in automatic speech recognition and/or natural language understanding processing.

Additionally, or alternatively, the process 600 may include determining an ambient noise decibel value associated with the environment in which the first microphone and the second microphone are disposed. The process 600 may also include determining a first period of time during which sound intensity level values associated with the environment are equal to or less than the ambient noise decibel value. In these examples, the first audio data and the second audio data are received during the first period of time.

Additionally, or alternatively, the process 600 may include determining a first recursive average of the first sound intensity level value over the predetermined number of audio frames. The process 600 may include determining a second recursive average of the second sound intensity level value over the predetermined number of audio frames. In these examples, wherein determining that the sound intensity level value is at least the predetermined sound intensity level value difference based at least in part on determining that the first recursive average differs from the second recursive average by the predetermined sound intensity level value.

Additionally, or alternatively, the process 600 may include receiving a command to generate the first audio data and the second audio data in response to decreased speech processing performance associated with audio data samples from a device associated with the first microphone and the second microphone. The process 600 may also include causing the first microphone to generate the first audio data based at least in part on the command. The process 600 may also include causing the second microphone to generate the second audio data based at least in part on the command.

Additionally, or alternatively, the process 600 may include receiving third audio data from the first microphone. The process 600 may also include generating fourth audio data representing the third audio data with a third sound intensity level value associated with the third audio data increased by the sound intensity level difference. In these examples, the first data comprises the fourth audio data.

Additionally, or alternatively, the process 600 may include generating the first data representing a beamforming coefficient configured to increase sound intensity level values associated with the first microphone by the sound intensity level value difference. The process 600 may also include receiving third audio data from the first microphone. In these examples, causing performance of the beamforming process may be based at least in part on applying the beamforming coefficient to the third audio data.

Additionally, or alternatively, the process 600 may include determining sound intensity level values associated with sample audio data generated by at least one of the first microphone or the second microphone over a period of time. The process 600 may also include determining a reference sound intensity level value of the sound intensity level values that indicates when the sound intensity level values are associated with ambient noise. The process 600 may also include determining a time period when the sample audio data is associated with the reference sound intensity level value. The process 600 may also include determining that the first audio data and the second audio data were received during the time period. In these examples, determining that the sound intensity level value difference is at least the predetermined sound intensity level value based at least in part on the first audio data and the second audio data being received during the time period.

Additionally, or alternatively, the process 600 may include receiving third audio data from a third microphone, the third audio data indicating a third sound intensity level value of the third audio data. The process 600 may also include receiving fourth audio data from the second microphone, the fourth audio data indicating a fourth sound intensity level value of the fourth audio data. The process 600 may also include determining that a second sound intensity level value difference between the fourth sound intensity level value and the third sound intensity level value is equal to or greater than a second predetermined sound intensity level value, wherein the second sound intensity level value indicates microphone failure. The process 700 may also include refraining from utilizing audio data samples from the third microphone in response to determining that the second sound intensity level value difference is equal to or greater than the second sound intensity level value.

Figure 7:
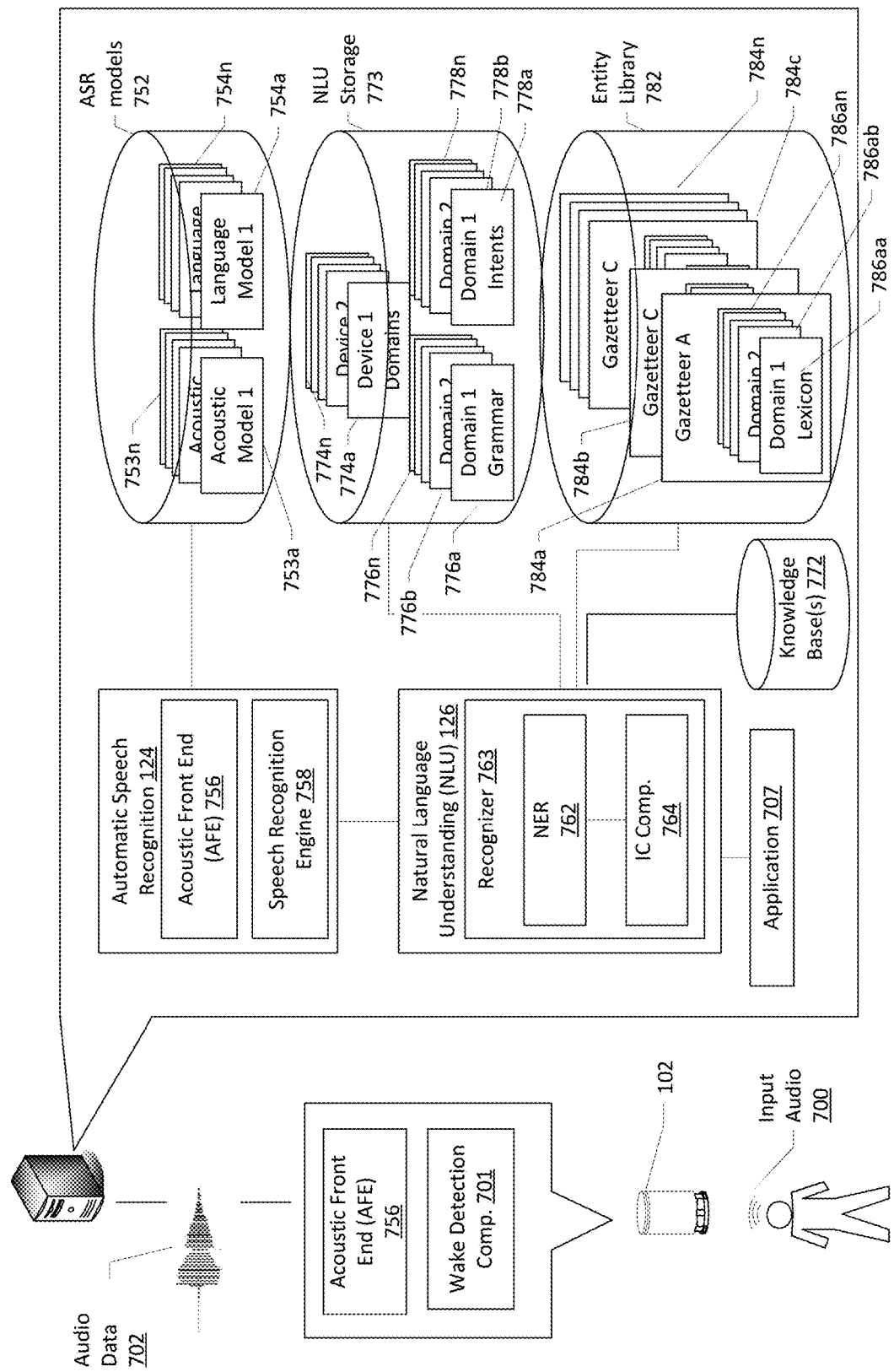
FIG. 7 illustrates a conceptual diagram of components of a speech-processing system for processing audio data provided by one or more devices.

FIG. 7 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 104). The various components illustrated may be located on a same device or different physical devices. Message between various components illustrated in FIG. 7 may occur directly or across a network 106. An audio capture component, such as a microphone 114 of the device 102, or another device, captures audio 700 corresponding to a spoken utterance. The device 102, using a wake-word component 701, then processes audio data corresponding to the audio 700 to determine if a keyword (such as a wakeword) is detected in the audio data. Following detection of a wakeword, the device 102 sends audio data 702 corresponding to the utterance to the remote system 104 that includes an ASR component 124. The audio data 702 may be output from an optional acoustic front end (AFE) 756 located on the device prior to transmission. In other instances, the audio data 702 may be in a different form for processing by a remote AFE 756, such as the AFE 756 located with the ASR component 124 of the remote system 104.

The wake-word component 701 works in conjunction with other components of the user device, for example a microphone to detect keywords in audio 700. For example, the device may convert audio 700 into audio data, and process the audio data with the wake-word component 701 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 701 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 701 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 702 corresponding to input audio 700 to the remote system 104 for speech processing. Audio data corresponding to that audio may be sent to remote system 104 for routing to a recipient device or may be sent to the remote system 104 for speech processing for interpretation of the included speech (either for purposes of enabling voice-messages and/or for purposes of executing a command in the speech). The audio data 702 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 104, an ASR component 124 may convert the audio data 702 into text. The ASR transcribes audio data into text data representing the words of the speech contained in the audio data 702. The text data may then be used by other components for various purposes, such as executing system commands, inputting data, etc. A spoken utterance in the audio data is input to a processor configured to perform ASR which then interprets the utterance based on the similarity between the utterance and pre-established language models 754 stored in an ASR model knowledge base (ASR Models Storage 752). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 124 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data and divide the digitized audio data into frames representing time intervals for which the AFE 756 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE. For example, the user device may process audio data into feature vectors (for example using an on-device AFE 756) and transmit that information to a server across a network for ASR processing. Feature vectors may arrive at the remote system 104 encoded, in which case they may be decoded prior to processing by the processor executing the speech recognition engine 758.

The speech recognition engine 758 attempts to match received feature vectors to language phonemes and words as known in the stored acoustic models 753 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Song A?" The wake detection component may identify the wake word, otherwise described as a trigger expression, "Alexa," in the user utterance and may "wake" based on identifying the wake word. Audio data corresponding to the user utterance may be sent to the remote system 104, where the speech recognition engine 758 may identify, determine, and/or generate text data corresponding to the user utterance, here "play Song A."

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 758 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 104, for natural language understanding (NLU) processing, such as conversion of the text into commands for execution, either by the user device, by the remote system 104, or by another device (such as a server running a specific application like a search engine, etc.).

The device performing NLU processing 126 (e.g., server 104) may include various components, including potentially dedicated processor(s), memory, storage, etc. As shown in FIG. 7, an NLU component 126 may include a recognizer 763 that includes a named entity recognition (NER) component 762 which is used to identify portions of query text that correspond to a named entity that may be recognizable by the system. A downstream process called named entity resolution links a text portion to a specific entity known to the system. To perform named entity resolution, the system may utilize gazetteer information (784a-784n) stored in entity library storage 782. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 124 based on the utterance input audio 700) and attempts to make a semantic interpretation of the text. That is, the NLU process determines the meaning behind the text based on the individual words and then implements that meaning. NLU processing 126 interprets a text string to derive an intent or a desired action from the user as well as the pertinent pieces of information in the text that allow a device (e.g., device 102) to complete that action. For example, if a spoken utterance is processed using ASR 124 and outputs the text "play Song A" the NLU process may determine that the user intended to establish output audio corresponding to Song A.

The NLU may process several textual inputs related to the same utterance. For example, if the ASR 124 outputs N text segments (as part of an N-best list), the NLU may process all N outputs to obtain NLU results.

As will be discussed further below, the NLU process may be configured to parse and tag to annotate text as part of NLU processing. For example, for the text "play Song A," "play" may be tagged as a command (to output audio) and "Song A" may be tagged as the naming identifier of the file to play.

To correctly perform NLU processing of speech input, an NLU process 126 may be configured to determine a "domain" of the utterance so as to determine and narrow down which services offered by the endpoint device (e.g., remote system 104 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 762 receives a query in the form of ASR results and attempts to identify relevant grammars and lexical information that may be used to construe meaning. To do so, the NLU component 126 may begin by identifying potential domains that may relate to the received query. The NLU storage 773 includes a database of devices (774a-774n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 763, language model and/or grammar database (776a-776n), a particular set of intents/actions (778a-778n), and a particular personalized lexicon (786). Each gazetteer (784a-784n) may include domain-indexed lexical information associated with a particular user and/or device. For example, the Gazetteer A (784a) includes domain-index lexical information 786aa to 786an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 764 parses the query to determine an intent or intents for each identified domain, where the intent corresponds to the action to be performed that is responsive to the query. Each domain is associated with a database (778a-778n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 764 identifies potential intents for each identified domain by comparing words in the query to the words and phrases in the intents database 778. In some instances, the determination of an intent by the IC component 764 is performed using a set of rules or templates that are processed against the incoming text to identify a matching intent.

In order to generate a particular interpreted response, the NER 762 applies the grammar models and lexical information associated with the respective domain to actually recognize a mention of one or more entities in the text of the query. In this manner, the NER 762 identifies "slots" or values (i.e., particular words in query text) that may be needed for later command processing. Depending on the complexity of the NER 762, it may also label each slot with a type of varying levels of specificity (such as noun, place, device name, device location, city, artist name, song name, amount of time, timer number, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC component 764 are linked to domain-specific grammar frameworks (included in 776) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "call" is an identified intent, a grammar (776) framework or frameworks may correspond to sentence structures such as "call device with {Rob} identifier."

For example, the NER component 762 may parse the query to identify words as subject, object, verb, preposition, etc., based on grammar rules and/or models, prior to recognizing named entities. The identified verb may be used by the IC component 764 to identify intent, which is then used by the NER component 762 to identify frameworks. A framework for the intent of "play a song," meanwhile, may specify a list of slots/fields applicable to play the identified "song" and any object modifier (e.g., specifying a music collection from which the song should be accessed) or the like. The NER component 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 762 may search the database of generic words associated with the domain (in the knowledge base 772). So, for instance, if the query was "identify this song," after failing to determine which song is currently being output, the NER component 762 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 707. The destination application 707 may be determined based on the NLU output. For example, if the NLU output includes a command to send a message, the destinated application 707 may be a message sending application, such as one located on the user device or in a message sending appliance, configured to execute a message sending command. If the NLU output includes a search request, the destination application 707 may include a search engine processor, such as one located on a search server, configured to execute a search command. After the appropriate command is generated based on the intent of the user, the application 707 may provide some or all of this information to a text-to-speech (TTS) engine. The TTS engine may then generate an actual audio file for outputting the audio data determined by the application 707 (e.g., "okay," or "playing Song A"). After generating the file (or "audio data"), the TTS engine may provide this data back to the remote system 104.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 126 during runtime operations where NLU operations are performed on text (such as text output from an ASR component 124). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer may include various NLU components such as an NER component 762, IC component 764 and other components such as an entity resolver, or other components.

For example, a messaging domain recognizer 763-A (Domain A) may have an NER component 762-A that identifies what slots (i.e., portions of input text) may correspond to particular words relevant to that domain. The words may correspond to entities such as (for the messaging domain) a recipient. An NER component 762 may use a machine learning model, such as a domain specific conditional random field (CRF) to both identify the portions corresponding to an entity as well as identify what type of entity corresponds to the text portion. The messaging domain recognizer 763-A may also have its own intent classification (IC) component 764-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 104, as illustrated herein are exemplary, and may be located in a stand-alone device or may be included, in whole or in part, as a component of a larger device or system, may be distributed across a network or multiple devices connected by a network, etc.

Figure 8:
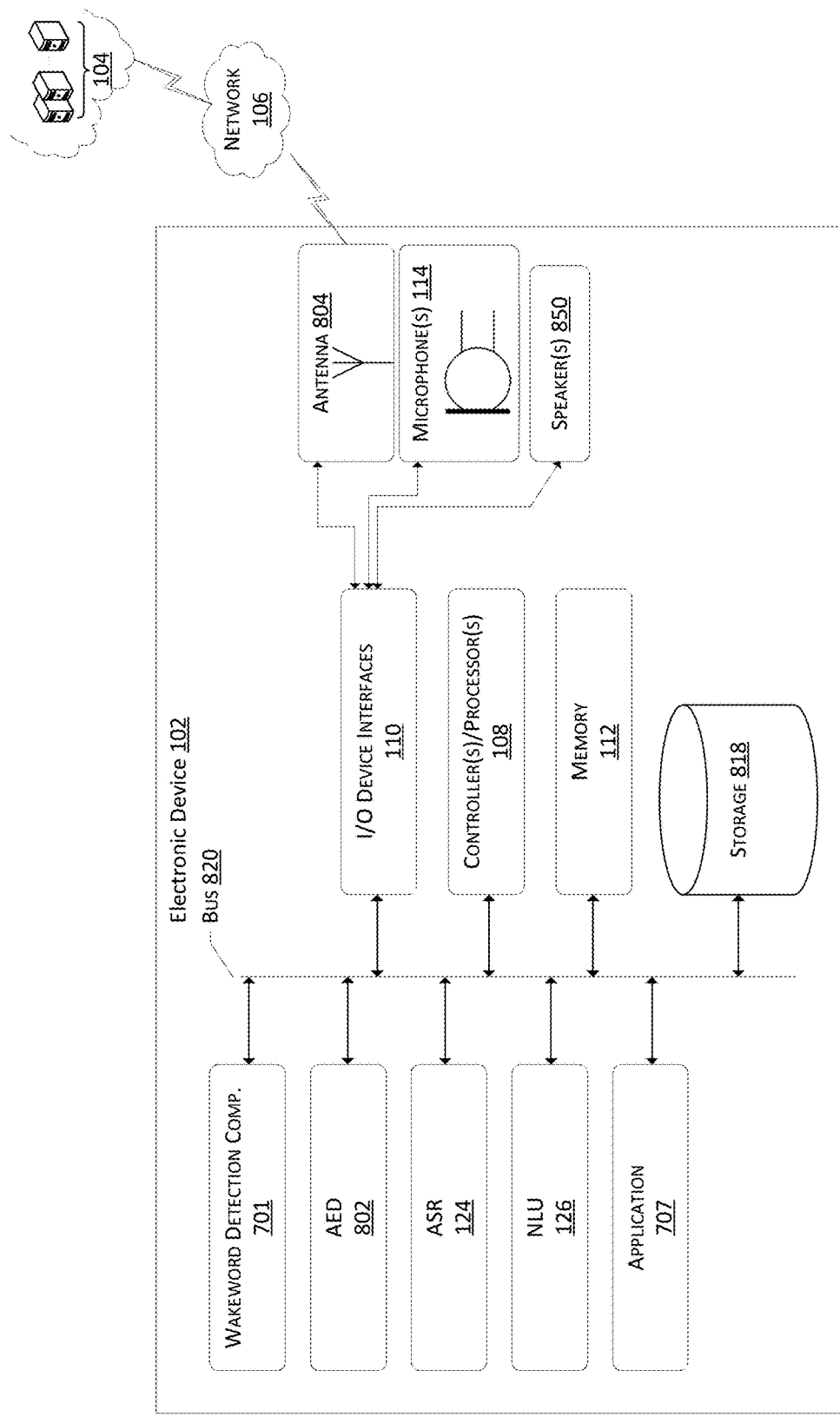
FIG. 8 illustrates a conceptual diagram of example components of an electronic device that may be utilized in association with microphone degradation detection and compensation.

FIG. 8 illustrates a conceptual diagram of example components of an electronic device 102 that may be utilized in association with boundary approximation. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 114, a power source, and functionality for sending generated audio data via one or more antennas 804 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) 850 and may utilize speaker(s) 850 of an external or peripheral device to output audio via the speaker(s) 850 of the external/peripheral device. In this example, the device 102 might represent a set-top box (STB), and the device 102 may utilize speaker(s) 850 of another device such as a television that is connected to the STB for output of audio via the external speakers 850. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 8 may include one or more controllers/processors 108, that may include a central processing unit (CPU) for processing data and computer-readable instructions, and memory 112 for storing data and instructions of the device 102. The device 102 may also be connected to removable or external non-volatile memory and/or storage, such as a removable memory card, memory key drive, networked storage, etc., through input/output device interfaces 110.

Computer instructions for operating the device 102 and its various components may be executed by the device's controller(s)/processor(s) 108, using the memory 112 as temporary "working" storage at runtime. A device's computer instructions may be stored in a non-transitory manner in non-volatile memory 112, storage 818, or an external device(s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 820 for conveying data among components of the respective device. Each component within a device 102 may also be directly connected to other components in addition to, or instead of, being connected to other components across the bus 820.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102 (using microphone 114, wakeword detection component 801, ASR component 124, etc.) may be configured to generate audio data corresponding to captured audio. The device 102 (using input/output device interfaces 110, antenna 804, etc.) may also be configured to transmit the audio data to the remote system 104 for further processing or to process the data using internal components such as a wakeword detection component 801.

Via the antenna(s) 804, the input/output device interface 110 may connect to one or more networks 104 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 106, the speech-processing system may be distributed across a networked environment. Accordingly, the device 102 and/or the remote system 104 may include an ASR component 124. The ASR component 124 of device 102 may be of limited or extended capabilities. The ASR component 124 may include language models stored in ASR model storage component, and an ASR component 124 that performs automatic speech recognition. If limited speech recognition is included, the ASR component 124 may be configured to identify a limited number of words, such as keywords detected by the device, whereas extended speech recognition may be configured to recognize a much larger range of words.

The device 102 and/or the remote system 104 may include a limited or extended NLU component 126. The NLU component 126 of device 102 may be of limited or extended capabilities. The NLU component 126 may comprise a name entity recognition module, an intent classification module and/or other components. The NLU component 126 may also include a stored knowledge base and/or entity library, or those storages may be separately located.

In examples, AED 802 may also be performed by the device 102. In these examples, the operations may include causing the AED component 802 to be enabled or otherwise turned on, or the operations may include causing the AED component 802 to transition from a first mode to a second mode representing a higher sensitivity to audio data generated by the microphone 114. The AED component 802 may utilize the audio data generated by the microphone 114 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 802 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 802 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 104 may also include an application 707 that is configured to execute commands/functions associated with a spoken command as described herein. The device 102 may include a wake word engine, which may be a separate component or may be included in an ASR component 124. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 850 and may utilize speaker(s) 850 of an external or peripheral device to output audio via the speaker(s) 850 of the external/peripheral device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving first audio data corresponding to first audio received by a first microphone, the first audio data indicating a first decibel value of the first audio;
receiving second audio data corresponding to the first audio received by a second microphone, the second audio data indicating a second decibel value of the first audio;
determining a decibel value difference between the second decibel value and the first decibel value, the decibel value difference satisfying a threshold decibel value indicating microphone degradation causing a decrease in microphone performance;
receiving third audio data corresponding to second audio received by the first microphone;
generating fourth audio data representing the third audio data with a third decibel value associated with the third audio data increased by the decibel value difference; and
determining a direction of a source of the second audio relative to the first microphone utilizing the fourth audio data as a data source for the first microphone.

2. The system of claim 1, the operations further comprising:

determining an ambient noise decibel value associated with an environment in which the first microphone and the second microphone are disposed; and determining, using one of the first microphone or the second microphone, a first period of time during which a sound intensity level value associated with the environment is substantially the same as the ambient noise decibel value;

wherein the first audio data and the second audio data are received during the first period of time.

3. The system of claim 1, wherein the threshold decibel value comprises a first threshold decibel value, the decibel value difference comprises a first decibel value difference, and the operations further comprise:

receiving fifth audio data from a third microphone, the fifth audio data indicating a third decibel value of the fifth audio data;

receiving sixth audio data from the second microphone, the sixth audio data indicating a fourth decibel value of the sixth audio data;

determining that a second decibel value difference between the fourth decibel value and the third decibel value is equal to or greater than a second threshold decibel value, wherein the second threshold decibel value indicates microphone failure; and refraining from utilizing audio data samples from the third microphone in response to determining that the second decibel value difference is equal to or greater than the second threshold decibel value.

4. The system of claim 1, wherein the first audio data and the second audio data are received at a first time, the threshold decibel value comprises a first threshold decibel value, and the operations further comprise:

receiving, at a second time occurring after the first time, fifth audio data from the first microphone, the fifth audio data indicating a third decibel value of the fifth audio data;

receiving, at the second time, sixth audio data from the second microphone, the sixth audio data indicating a fourth decibel value of the sixth audio data;

determining that a second decibel value difference between the fourth decibel value and the third decibel value is equal to or greater than a second threshold decibel value, wherein the second threshold decibel value indicates more microphone degradation than the first threshold decibel value; and in response to determining that the second decibel value difference is equal to or greater than the second threshold decibel value, increasing a beamforming coefficient associated with the first microphone to compensate for the second decibel value difference.

5. A method, comprising:

receiving first audio data from a first microphone, the first audio data indicating a first sound intensity level value of the first audio;

receiving second audio data from a second microphone, the second audio data indicating a second sound intensity level value of the first audio;

determining that a sound intensity level value difference between the second sound intensity level value and the first sound intensity level value is at least a predetermined sound intensity level value difference;

determining a beamforming coefficient configured to increase sound intensity level values associated with the first microphone by the sound intensity level value difference;

receiving third audio data from the first microphone; and causing performance of a beamforming process using the beamforming coefficient and the third audio data.

6. The method of claim 5, further comprising:

determining an ambient noise decibel value associated with an environment in which the first microphone and the second microphone are disposed; and determining a first period of time during which sound intensity level values associated with the environment are equal to or less than the ambient noise decibel value;

wherein the first audio data and the second audio data are received during the first period of time.

7. The method of claim 5, wherein the first audio data and the second audio data are received over a predetermined number of audio frames, and the method further comprises:

determining a first recursive average of the first sound intensity level value over the predetermined number of audio frames;

determining a second recursive average of the second sound intensity level value over the predetermined number of audio frames; and wherein determining that the sound intensity level value is at least the predetermined sound intensity level value difference comprises determining that the sound intensity level value is at least the predetermined sound intensity level value difference based at least in part on determining that the first recursive average differs from the second recursive average by the predetermined sound intensity level value.

8. The method of claim 5, further comprising:

receiving a command to generate the first audio data and the second audio data in response to decreased speech processing performance associated with audio data samples from a device associated with the first microphone and the second microphone;

causing the first microphone to generate the first audio data based at least in part on the command; and causing the second microphone to generate the second audio data based at least in part on the command.

9. The method of claim 5, further comprising:

determining sound intensity level values associated with sample audio data generated by at least one of the first microphone or the second microphone over a period of time;

determining a reference sound intensity level value of the sound intensity level values that indicates when the sound intensity level values are associated with ambient noise;

determining a time period when the sample audio data is associated with the reference sound intensity level value;

determining that the first audio data and the second audio data were received during the time period; and wherein determining that the sound intensity level value difference is at least the predetermined sound intensity level value difference comprises determining that the sound intensity level value difference is at least the predetermined sound intensity level value based at least in part on the first audio data and the second audio data being received during the time period.

10. The method of claim 5, wherein the predetermined sound intensity level value comprises a first predetermined sound intensity level value, the sound intensity level value difference comprises a first sound intensity level value difference, and the method further comprises:

receiving third audio data from a third microphone, the third audio data indicating a third sound intensity level value of the third audio data;

receiving fourth audio data from the second microphone, the fourth audio data indicating a fourth sound intensity level value of the fourth audio data;

determining that a second sound intensity level value difference between the fourth sound intensity level value and the third sound intensity level value is equal to or greater than a second predetermined sound intensity level value, wherein the second sound intensity level value indicates microphone failure; and refraining from utilizing audio data samples from the third microphone in response to determining that the second sound intensity level value difference is equal to or greater than the second sound intensity level value.

11. A device, comprising:

a first microphone that receives first audio;

a second microphone that receives the first audio;

one or more processors; and non-transitory computer-readable media storing computer-executable instructions that, when executed by the one or more processors, cause the one or more processors to perform operations comprising:

determining an ambient noise value associated with an environment of the device;

receiving, from the first microphone and during a period of time first audio data indicating a first sound intensity level value of the first audio, wherein during the period of time a sound intensity value associated with the environment is equal to or less than the ambient noise value;

receiving, from the second microphone and during the period of time, second audio data indicating a second sound intensity level value of the first audio;

determining, based at least in part on the first audio data and the second audio data, a sound intensity level value difference between the second sound intensity level value and the first sound intensity level value, the sound intensity level value difference satisfying a threshold sound intensity level value difference; and performing a beamforming process utilizing first data configured to account for the sound intensity level value difference.

12. The device of claim 11, wherein the first audio data and the second audio data are received over a predetermined number of audio frames, and the operations further comprise:

determining a first recursive average of the first sound intensity level value over the predetermined number of audio frames;

determining a second recursive average of the second sound intensity level value over the predetermined number of audio frames; and determining that the sound intensity level value is at least the threshold sound intensity level value difference based at least in part on determining that the first recursive average differs from the second recursive average by the threshold sound intensity level value.

13. The device of claim 11, further comprising a network interface, and the operations further comprising:

receiving, via the network interface and from a remote speech-processing system, a command to generate the first audio data and the second audio data in response to decreased speech processing performance associated with audio data samples from the device;

causing the first microphone to generate the first audio data based at least in part on the command; and causing the second microphone to generate the second audio data based at least in part on the command.

14. The device of claim 11, the operations further comprising:

receiving third audio data from the first microphone;

generating fourth audio data representing the third audio data with a third sound intensity level value associated with the third audio data increased by the sound intensity level difference; and wherein the first data comprises the fourth audio data.

15. The device of claim 11, further comprising a network interface, and the operations further comprise:

sending, via the network interface and to a remote system, first data indicating the sound intensity level value difference;

receiving, via the network interface and from the remote system, second data representing a beamforming coefficient configured to increase sound intensity level values associated with the first microphone by the sound intensity level value difference;

receiving third audio data from the first microphone; and wherein performing the beamforming process comprises performing the beamforming process using the beamforming coefficient and the third audio data.

16. The device of claim 11, further comprising a network interface, and the operations further comprise:

sending, via the network interface and to a remote system, sample audio data generated by at least one of the first microphone or the second microphone over a period of time;

receiving, via the network interface and from the remote system, a command to cause the first microphone and the second microphone to generate audio data during a time of day when the remote system has determined that a reference sound intensity level value associated with the sample audio data indicates sound intensity level values of the environment in which the device is disposed is associated with only ambient noise;

causing the first microphone to generate the first audio data during the time of day based at least in part on the command; and causing the second microphone to generate the second audio data during the time of day based at least in part on the command.

17. The device of claim 11, further comprising a network interface, and the operations further comprise:

sending, via the network interface and to a remote system, first data indicating the sound intensity level value difference;

receiving, via the network interface and from the remote system, second data indicating that the remote system has determined that the sound intensity level value difference indicates microphone failure of the first microphone; and refraining from utilizing the first microphone for generating audio data.

* * * * *